United States Patent
Spitz et al.

(10) Patent No.: US 9,451,010 B2
(45) Date of Patent: Sep. 20, 2016

(54) CONTAINERIZED SOFTWARE FOR VIRALLY COPYING FROM ONE ENDPOINT TO ANOTHER

(71) Applicant: Cinsay, Inc., Dallas, TX (US)

(72) Inventors: Robert K. Spitz, Ameherst, NH (US); Sergey L. Sundukovskiy, Redondo Beach, CA (US); Christian Briggs, Austin, TX (US)

(73) Assignee: Cinsay, Inc., Dallas, TX (US)

( * ) Notice: Subject to any disclaimer, the term of this patent is extended or adjusted under 35 U.S.C. 154(b) by 292 days.

(21) Appl. No.: 14/280,235

(22) Filed: May 16, 2014

(65) Prior Publication Data

US 2014/0250211 A1 Sep. 4, 2014

Related U.S. Application Data

(63) Continuation of application No. 13/598,443, filed on Aug. 29, 2012, now Pat. No. 8,769,053.

(60) Provisional application No. 61/528,635, filed on Aug. 29, 2011, provisional application No. 61/650,917, (Continued)

(51) Int. Cl.
| | | |
|---|---|---|
| *G06F 15/16* | (2006.01) | |
| *H04L 29/08* | (2006.01) | |
| *G06Q 30/06* | (2012.01) | |
| *G06Q 30/02* | (2012.01) | |
| *G06F 12/00* | (2006.01) | |

(52) U.S. Cl.
CPC ............ *H04L 67/06* (2013.01); *G06Q 30/0251* (2013.01); *G06Q 30/0601* (2013.01); *H04L 29/08072* (2013.01)

(58) Field of Classification Search
USPC .................. 709/203, 217–219, 223–229, 250
See application file for complete search history.

(56) References Cited

U.S. PATENT DOCUMENTS

| | | |
|---|---|---|
| 5,715,400 A | 2/1998 | Reimer et al. |
| 5,774,664 A | 6/1998 | Hidary et al. |
| 5,778,181 A | 7/1998 | Hidary et al. |
| 5,903,816 A | 5/1999 | Broadwin et al. |

(Continued)

FOREIGN PATENT DOCUMENTS

| | | |
|---|---|---|
| CN | 102782608 | 11/2012 |
| KR | 100824197 | 4/2008 |

(Continued)

OTHER PUBLICATIONS

Office Action dated Aug. 27, 2014 in connection with U.S. Appl. No. 14/079,385.

(Continued)

*Primary Examiner* — Zarni Maung

(57) ABSTRACT

A method, system and computer readable medium include objects with media content. The method includes receiving, at one or more servers, a request for the media content to be displayed at an endpoint. The method includes identifying information about an environment associated with the endpoint. The method includes identifying a set of objects to include in a container for the media content based on the information identified about the environment. At least one of the objects includes program code for completing a transaction during display of the media content. Additionally, the method includes sending, by one or more servers, the set of objects to the endpoint.

28 Claims, 14 Drawing Sheets

Related U.S. Application Data filed on May 23, 2012, provisional application No. 61/650,873, filed on May 23, 2012, provisional application No. 61/650,888, filed on May 23, 2012, provisional application No. 61/650,897, filed on May 23, 2012, provisional application No. 61/650,900, filed on May 23, 2012, provisional application No. 61/650,881, filed on May 23, 2012, provisional application No. 61/662,765, filed on Jun. 21, 2012.

(56) References Cited

U.S. PATENT DOCUMENTS

| | | | |
|---|---|---|---|
| 5,929,849 A | 7/1999 | Kikinis | |
| 6,006,257 A | 12/1999 | Slezak | |
| 6,009,410 A | 12/1999 | LeMole et al. | |
| 6,014,638 A | 1/2000 | Burge et al. | |
| 6,018,768 A | 1/2000 | Ullman et al. | |
| 6,154,771 A | 11/2000 | Rangan et al. | |
| 6,169,573 B1 | 1/2001 | Sampath-Kumar et al. | |
| 6,188,398 B1 | 2/2001 | Collins-Rector et al. | |
| 6,233,682 B1 | 5/2001 | Fritsch | |
| 6,240,555 B1 | 5/2001 | Shoff et al. | |
| 6,263,505 B1 | 7/2001 | Walker et al. | |
| 6,275,989 B1 | 8/2001 | Broadwin et al. | |
| 6,282,713 B1 | 8/2001 | Kitsukawa et al. | |
| 6,321,209 B1 | 11/2001 | Pasquali | |
| 6,330,595 B1 | 12/2001 | Ullman et al. | |
| 6,357,042 B2 | 3/2002 | Srinivasan et al. | |
| 6,536,041 B1 | 3/2003 | Knudson et al. | |
| 6,553,566 B1 | 4/2003 | Grant et al. | |
| 6,564,380 B1 | 5/2003 | Murphy | |
| 6,573,907 B1 | 6/2003 | Madrane | |
| 6,628,307 B1 | 9/2003 | Fair | |
| 6,766,528 B1 | 7/2004 | Kim et al. | |
| 6,857,010 B1 | 2/2005 | Cuijpers et al. | |
| 6,910,049 B2 | 6/2005 | Fenton et al. | |
| 6,912,726 B1 | 6/2005 | Chen et al. | |
| 6,941,575 B2 | 9/2005 | Allen | |
| 6,976,028 B2 | 12/2005 | Fenton et al. | |
| 6,990,498 B2 | 1/2006 | Fenton et al. | |
| 7,000,242 B1 | 2/2006 | Haber | |
| 7,017,173 B1 | 3/2006 | Armstrong et al. | |
| 7,072,683 B2 | 7/2006 | King et al. | |
| 7,136,853 B1 | 11/2006 | Kohda et al. | |
| 7,158,676 B1 | 1/2007 | Rainsford | |
| 7,162,263 B2 | 1/2007 | King et al. | |
| 7,168,051 B2 | 1/2007 | Robinson et al. | |
| 7,188,186 B1 | 3/2007 | Meyer et al. | |
| 7,207,057 B1 | 4/2007 | Rowe | |
| 7,222,163 B1 | 5/2007 | Girouard et al. | |
| 7,231,651 B2 | 6/2007 | Pong | |
| 7,243,139 B2 | 7/2007 | Ullman et al. | |
| 7,254,622 B2 | 8/2007 | Nomura et al. | |
| 7,269,837 B1 | 9/2007 | Redling et al. | |
| 7,331,057 B2 | 2/2008 | Eldering et al. | |
| 7,353,186 B2 | 4/2008 | Kobayashi | |
| 7,409,437 B2 | 8/2008 | Ullman et al. | |
| 7,412,406 B2 | 8/2008 | Rosenberg | |
| 7,432,768 B2 | 10/2008 | Han et al. | |
| 7,444,659 B2 | 10/2008 | Lemmons | |
| 7,464,344 B1 | 12/2008 | Carmichael et al. | |
| 7,485,397 B2 | 2/2009 | Eck et al. | |
| 7,487,112 B2 | 2/2009 | Barnes, Jr. | |
| 7,509,340 B2 | 3/2009 | Fenton et al. | |
| 7,539,738 B2 | 5/2009 | Stuckman et al. | |
| 7,574,381 B1 | 8/2009 | Lin-Hendel | |
| 7,593,965 B2 | 9/2009 | Gabriel | |
| 7,613,691 B2 | 11/2009 | Finch | |
| 7,614,013 B2 | 11/2009 | Dollar et al. | |
| 7,624,416 B1 | 11/2009 | Vandermolen et al. | |
| 7,631,327 B2 | 12/2009 | Dempski et al. | |
| 7,661,121 B2 | 2/2010 | Smith et al. | |
| 7,664,678 B1 | 2/2010 | Haber | |
| 7,673,017 B2 | 3/2010 | Kim et al. | |
| 7,691,666 B2 | 4/2010 | Levy et al. | |
| 7,721,307 B2 | 5/2010 | Hendricks et al. | |
| 7,725,362 B2 | 5/2010 | Weathers, Jr. | |
| 7,739,596 B2 | 6/2010 | Clarke-Martin et al. | |
| 7,747,037 B2 | 6/2010 | Hein, III | |
| 7,750,343 B2 | 7/2010 | Choi et al. | |
| 7,756,758 B2 | 7/2010 | Johnson et al. | |
| 7,769,827 B2 | 8/2010 | Girouard et al. | |
| 7,769,830 B2 | 8/2010 | Stuckman et al. | |
| 7,773,093 B2 | 8/2010 | Bates et al. | |
| 7,774,161 B2 | 8/2010 | Tischer | |
| 7,774,815 B1 | 8/2010 | Allen | |
| 7,796,941 B2 | 9/2010 | Poltorak | |
| 7,800,102 B2 | 9/2010 | Park et al. | |
| 7,804,506 B2 | 9/2010 | Bates et al. | |
| 7,818,763 B2 | 10/2010 | Sie et al. | |
| 7,870,592 B2 | 1/2011 | Hudson et al. | |
| 7,885,951 B1 | 2/2011 | Rothschild | |
| 7,899,719 B2 | 3/2011 | Lin-Hendel | |
| 7,912,753 B2 | 3/2011 | Struble | |
| 7,923,722 B2 | 4/2011 | Ryu et al. | |
| 7,923,772 B2 | 4/2011 | Mauder et al. | |
| 7,925,973 B2 | 4/2011 | Allaire et al. | |
| 7,946,492 B2 | 5/2011 | Rohs | |
| 7,975,020 B1 | 7/2011 | Green et al. | |
| 7,975,062 B2 | 7/2011 | Krikorian et al. | |
| 7,979,877 B2 | 7/2011 | Huber et al. | |
| 7,982,216 B2 | 7/2011 | Imai | |
| 7,987,098 B2 | 7/2011 | Schifone | |
| 7,987,483 B1 | 7/2011 | Des Jardins | |
| 8,001,116 B2 | 8/2011 | Cope | |
| 8,001,577 B2 | 8/2011 | Fries | |
| 8,006,265 B2 | 8/2011 | Redling et al. | |
| 8,010,408 B2 | 8/2011 | Rubinstein et al. | |
| 8,032,421 B1 | 10/2011 | Ho et al. | |
| 8,055,688 B2 | 11/2011 | Giblin | |
| 8,091,103 B2 | 1/2012 | Cope | |
| 8,108,257 B2 | 1/2012 | Sengamedu | |
| 8,117,281 B2 | 2/2012 | Robinson et al. | |
| 8,122,480 B2 | 2/2012 | Sholtis | |
| 8,132,486 B1 | 3/2012 | Calvert | |
| 8,141,112 B2 | 3/2012 | Cope et al. | |
| 8,181,212 B2 | 5/2012 | Sigal | |
| 8,196,162 B2 | 6/2012 | van de Klashorst | |
| 8,234,218 B2 | 7/2012 | Robinson et al. | |
| 8,244,830 B2 | 8/2012 | Robinson et al. | |
| 8,312,486 B1 | 11/2012 | Briggs et al. | |
| 8,316,450 B2 | 11/2012 | Robinson et al. | |
| 8,341,152 B1 | 12/2012 | Bates | |
| 8,356,077 B2 | 1/2013 | Robinson et al. | |
| 8,423,467 B1 | 4/2013 | Johansson et al. | |
| 8,433,611 B2 | 4/2013 | Lax et al. | |
| 8,438,646 B2 | 5/2013 | Sidi | |
| 8,458,053 B1 | 6/2013 | Buron et al. | |
| 8,468,562 B2 | 6/2013 | Miller et al. | |
| 8,549,555 B2 | 10/2013 | Briggs et al. | |
| 8,615,474 B2 | 12/2013 | Avedissian et al. | |
| 8,635,169 B2 | 1/2014 | Avedissian et al. | |
| 8,639,621 B1 | 1/2014 | Ellis et al. | |
| 8,645,214 B2 | 2/2014 | Hipolito et al. | |
| 8,645,217 B2 | 2/2014 | Siegel et al. | |
| 8,645,991 B2 | 2/2014 | McIntire et al. | |
| 8,655,146 B2 | 2/2014 | Bennett et al. | |
| 8,682,809 B2 | 3/2014 | Avedissian et al. | |
| 8,707,185 B2 | 4/2014 | Robinson et al. | |
| 8,708,223 B2 | 4/2014 | Gates et al. | |
| 8,725,826 B2 | 5/2014 | Robinson et al. | |
| 8,752,083 B2 | 6/2014 | Geer, III et al. | |
| 8,769,016 B2 | 7/2014 | Jakobson | |
| 8,769,053 B2 * | 7/2014 | Spitz | G06Q 30/0601 709/219 |
| 8,769,584 B2 | 7/2014 | Neumeier et al. | |
| 8,782,690 B2 | 7/2014 | Briggs et al. | |
| 8,813,132 B2 | 8/2014 | Andrews, II et al. | |
| 8,818,941 B2 * | 8/2014 | Kiilerich | G06F 17/30017 707/618 |
| 8,893,173 B2 | 11/2014 | Briggs et al. | |
| 2002/0059196 A1 | 5/2002 | I'Anson et al. | |
| 2002/0062481 A1 | 5/2002 | Slaney et al. | |
| 2002/0075332 A1 | 6/2002 | Geilfuss, Jr. et al. | |

(56) References Cited

U.S. PATENT DOCUMENTS

| | | |
|---|---|---|
| 2002/0083447 A1 | 6/2002 | Heron et al. |
| 2002/0083469 A1 | 6/2002 | Jeannin et al. |
| 2002/0126990 A1 | 9/2002 | Rasmussen et al. |
| 2002/0199181 A1 | 12/2002 | Allen |
| 2003/0023490 A1 | 1/2003 | Lenyon et al. |
| 2003/0028873 A1 | 2/2003 | Lemmons |
| 2003/0055723 A1 | 3/2003 | English |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0228615 A1 | 12/2003 | Rossi et al. |
| 2003/0231851 A1 | 12/2003 | Rantala et al. |
| 2004/0021684 A1 | 2/2004 | Millner |
| 2005/0022226 A1 | 1/2005 | Ackley et al. |
| 2005/0033656 A1 | 2/2005 | Wang et al. |
| 2005/0076372 A1 | 4/2005 | Moore et al. |
| 2005/0091107 A1 | 4/2005 | Blum |
| 2006/0009243 A1 | 1/2006 | Dahan et al. |
| 2006/0089843 A1 | 4/2006 | Flather |
| 2006/0122895 A1 | 6/2006 | Abraham et al. |
| 2006/0136305 A1 | 6/2006 | Fitzsimmons et al. |
| 2006/0202191 A1 | 9/2006 | Gerlach et al. |
| 2006/0242016 A1 | 10/2006 | Chenard |
| 2006/0256133 A1 | 11/2006 | Rosenberg |
| 2006/0265657 A1 | 11/2006 | Gilley |
| 2006/0276266 A1 | 12/2006 | Sullivan |
| 2007/0030080 A1 | 2/2007 | Han et al. |
| 2007/0087489 A1 | 4/2007 | Park et al. |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0250901 A1 | 10/2007 | McIntire et al. |
| 2007/0266399 A1 | 11/2007 | Sidi |
| 2007/0271149 A1 | 11/2007 | Siegel et al. |
| 2007/0276721 A1 | 11/2007 | Jackson |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0066099 A1 | 3/2008 | Brodersen et al. |
| 2008/0066107 A1 | 3/2008 | Moonka et al. |
| 2008/0097843 A1 | 4/2008 | Menon et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0162343 A1 | 7/2008 | Bedier |
| 2008/0177627 A1 | 7/2008 | Cefail |
| 2008/0177630 A1 | 7/2008 | Maghfourian et al. |
| 2008/0235085 A1 | 9/2008 | Kovinsky et al. |
| 2008/0250445 A1 | 10/2008 | Zigmond et al. |
| 2008/0255934 A1 | 10/2008 | Leventhal et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1 | 12/2008 | Gardner et al. |
| 2008/0319856 A1 | 12/2008 | Zito et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032809 A1 | 2/2009 | Kim et al. |
| 2009/0043674 A1 | 2/2009 | Minsky et al. |
| 2009/0077598 A1 | 3/2009 | Watson et al. |
| 2009/0083815 A1 | 3/2009 | McMaster et al. |
| 2009/0094339 A1 | 4/2009 | Allen et al. |
| 2009/0119169 A1 | 5/2009 | Chandratillake et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhnke et al. |
| 2009/0265255 A1 | 10/2009 | Jackson et al. |
| 2009/0276805 A1 | 11/2009 | Andrews, II et al. |
| 2009/0320073 A1 | 12/2009 | Reisman |
| 2010/0030578 A1 | 2/2010 | Siddique et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0223107 A1 | 9/2010 | Kim et al. |
| 2010/0247061 A1 | 9/2010 | Bennett et al. |
| 2010/0279766 A1 | 11/2010 | Pliska et al. |
| 2010/0283827 A1 | 11/2010 | Bustamente |
| 2010/0287580 A1 | 11/2010 | Harding et al. |
| 2010/0299616 A1 | 11/2010 | Chen et al. |
| 2010/0306402 A1 | 12/2010 | Russell et al. |
| 2010/0306805 A1 | 12/2010 | Neumeier et al. |
| 2010/0332329 A1 | 12/2010 | Roberts et al. |
| 2011/0004517 A1 | 1/2011 | Soto et al. |
| 2011/0052144 A1 | 3/2011 | Abbas et al. |
| 2011/0071865 A1 | 3/2011 | Leeds et al. |
| 2011/0133176 A1 | 6/2011 | Lee et al. |
| 2011/0173300 A1 | 7/2011 | Levy et al. |
| 2011/0191809 A1 | 8/2011 | Briggs et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2011/0321096 A1* | 12/2011 | Landow ............ H04N 21/47202 725/41 |
| 2012/0030704 A1 | 2/2012 | Schiller et al. |
| 2012/0036048 A1 | 2/2012 | Robb et al. |
| 2012/0079021 A1 | 3/2012 | Roman et al. |
| 2012/0158511 A1 | 6/2012 | Lucero et al. |
| 2012/0185355 A1 | 7/2012 | Kilroy |
| 2012/0201521 A1 | 8/2012 | Frojdh et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0284607 A1* | 11/2012 | Jones ................... G06F 17/212 715/234 |
| 2012/0296738 A1 | 11/2012 | Leeder |
| 2012/0296739 A1 | 11/2012 | Cassidy et al. |
| 2012/0296782 A1 | 11/2012 | Tsai et al. |
| 2012/0304065 A1 | 11/2012 | Cai |
| 2013/0014137 A1 | 1/2013 | Bhatia et al. |
| 2013/0014155 A1 | 1/2013 | Clarke et al. |
| 2013/0054757 A1* | 2/2013 | Spitz ................. G06Q 30/0601 709/219 |
| 2013/0110608 A1 | 5/2013 | Cassidy et al. |
| 2013/0117131 A1 | 5/2013 | Robinson et al. |
| 2013/0117409 A1* | 5/2013 | Yang .................... H04L 67/16 709/217 |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0162655 A1* | 6/2013 | Mueller ................ G06T 13/00 345/474 |
| 2013/0166382 A1 | 6/2013 | Cassidy et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0254018 A1 | 9/2013 | Rao |
| 2013/0290550 A1 | 10/2013 | Bangalore et al. |
| 2014/0019860 A1 | 1/2014 | Sathish et al. |
| 2014/0032366 A1 | 1/2014 | Spitz et al. |
| 2014/0052576 A1 | 2/2014 | Zelenka et al. |

(56) References Cited

U.S. PATENT DOCUMENTS

| | | |
|---|---|---|
| 2014/0095330 A1 | 4/2014 | Briggs et al. |
| 2014/0181208 A1 | 6/2014 | Robinson et al. |
| 2014/0208235 A1 | 7/2014 | Robinson et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |

FOREIGN PATENT DOCUMENTS

| | | |
|---|---|---|
| WO | WO 01/69364 A2 | 9/2001 |
| WO | WO 01/91869 | 12/2001 |
| WO | WO 2005/036875 | 4/2005 |
| WO | WO 2005/039131 | 4/2005 |
| WO | WO 2008/016634 A2 | 2/2008 |
| WO | WO 2009/012580 A1 | 1/2009 |
| WO | WO 2011/149491 A1 | 12/2011 |
| WO | WO 2013/033239 A1 | 3/2013 |
| WO | WO 2013/192557 A2 | 12/2013 |
| WO | WO 2015/013117 A1 | 1/2015 |
| WO | WO 2015/038795 A1 | 3/2015 |
| WO | WO 2015/038798 A1 | 3/2015 |
| WO | WO 2015/038802 A1 | 3/2015 |
| WO | WO 2015/048375 A1 | 4/2015 |
| WO | WO 2015/048377 A1 | 4/2015 |
| WO | WO 2015/054644 | 4/2015 |
| WO | WO 2015/054644 A1 | 4/2015 |

OTHER PUBLICATIONS

Office Action dated Aug. 27, 2014 in connection with U.S. Appl. No. 12/787,505.

Office Action dated Aug. 20, 2014 in connection with U.S. Appl. No. 13/923,089.

Office Action dated Jul. 9, 2014 in connection with U.S. Appl. No. 13/753,384.

International Search Report dated Nov. 24, 2014 in connection with International Application No. PCT/US14/55233; 2 pages.

Written Opinion of International Searching Authority dated Nov. 24, 2014 in connection with International Application No. PCT/US14/55233; 3 pages.

International Search Report dated Dec. 15, 2014 in connection with International Application No. PCT/US14/57595; 2 pages.

Written Opinion of International Searching Authority dated Dec. 15, 2014 in connection with International Application No. PCT/US14/57595; 3 pages.

International Search Report dated Dec. 16, 2014 in connection with International Application No. PCT/US14/55226; 2 pages.

Written Opinion of International Searching Authority dated Dec. 16, 2014 in connection with International Application No. PCT/US14/55226; 4 pages.

International Search Report dated Dec. 16, 2014 in connection with International Application No. PCT/US14/55229; 2 pages.

Written Opinion of International Searching Authority dated Dec. 16, 2014 in connection with International Application No. PCT/US14/55229; 4 pages.

Non-Final Office Action dated Oct. 2, 2014 in connection with U.S. Appl. No. 12/434,569; 18 pages.

Non-Final Office Action dated Dec. 18, 2014 in connection with U.S. Appl. No. 12/484,047; 8 pages.

Non-Final Office Action dated Dec. 19, 2014 in connection with U.S. Appl. No. 14/484,065; 8 pages.

Non-Final Office Action dated Dec. 26, 2015 in connection with U.S. Appl. No. 14/484,225; 8 pages.

Non-Final Office Action dated Jan. 6, 2015 in connection with U.S. Appl. No. 14/512,204; 18 pages.

International Search Report dated Jan. 9, 2015 in connection with International Application No. PCT/US14/57597; 2 pages.

Written Opinion of International Searching Authority dated Jan. 9, 2015 in connection with International Application No. PCT/US14/57597; 4 pages.

International Search Report dated Jan. 26, 2015 in connection with International Application No. PCT/US2014/060150; 2 pages.

Written Opinion of International Searching Authority dated Jan. 26, 2015 in connection with International Application No. PCT/US2014/060150; 4 pages.

Non-Final Office Action dated Jan. 9, 2015 in connection with U.S. Appl. No. 14/292,423; 14 pages.

Kongwah Wan, et al., "Advertising Insertion in Sports Webcasts", 2007 IEEE, p. 78-82.

Miguel Helft, "Google Aims to Make YouTube Profitable With Ads", The New York Times, Aug. 22, 2007, 3 pages.

Chris Tomlinson, "Google tries to relive past glories by making YouTube pay for itself", Birmingham Post, Sep. 4, 2007, 3 pages.

John Skidgel, "Producing Flash CS3 Video, Techniques for Video Pros and Web Designers", 2007, 9 pages.

Jan Krikke, "Streaming Video Transforms the Media Industry", IEEE, Jul./Aug. 2004, p. 6-12.

Tao Mei, et al., "VideoSense—Towards Effective Online Video Advertising", Sep. 23-28, 2007, p. 1075-1084.

Dr. Harry van Vliet, "Where Television and Internet meet . . . New experiences for rich media", Jan. 2002, 35 pages.

"IAB Announces Advertising Creative Guidelines for Online Broadband Video Commercials", Nov. 29, 2005, 4 pages.

"Digital Video In-Stream Ad Format Guidelines and Best Practices", Interactive Advertising Bureau, May 2008, 17 pages.

"Broadband Ad Creative Guidelines", Dec. 31, 2006, 3 pages.

Rich Media Guidelines: Fall 2004, Dec. 31, 2006, 3 pages.

"About Rich Media Guidelines Compliance: In-Page Units", Jan. 7, 2007, 2 pages.

"About Rich Media Guidelines Compliance: Over-the-Page Units", Jan. 7, 2007, 2 pages.

"Digital Video Ad Serving Template (VAST), Version 2.0", iab., Nov. 2009, 18 pages. (Redlined).

"Digital Video Ad Serving Template (VAST), Version 2.0", iab., Nov. 2009, 16 pages.

"DART Motif for In-Stream Helps Publishers Improve Efficiency, Push the Envelope with Video Ad Effects and Offer Advertisers Trusted, Reliable Reporting Metrics", Nov. 6, 2006, 3 pages.

"DoubleClick Debuts Video Ad-Serving Solution", Nov. 6, 2006, 2 pages.

Liz Gannes, "YouTube's New Inline Ads: Screenshots", May 11, 2007, 7 pages.

"Final Broadband Ad Creative Guidelines", Interactive Advertising Bureau, Standards & Guidelines, 4 pages.

Notification of Transmittal of the International Search Report and the Written Opinion of the International Searching Authority, or the Declaration dated Jan. 10, 2014 in connection with International Patent Application No. PCT/US13/47124.

"Content distributors can shopping-enable video content", www.web.archive.org, Apr. 27, 2007, 1 page.

Dan Kaplan, "Delivery Agent lets you buy products in your favorite TV shows", www.web.archive.org, May 4, 2007, 4 pages.

"Shopisodes Enable You to Dress Like Your Favorite TV Character", www.web.archive.org, Oct. 26, 2007, 1 page.

Jesse Liebman, "Reality TV That's Social, Bravo!", www.web.archive.org, Dec. 22, 2008, 6 pages.

Notification of Transmittal of the International Search Report and the Written Opinion of the International Searching Authority, or the Declaration dated Jun. 24, 2011 in connection with International Patent Application No. PCT/US10/57567.

"Akamai for Media & Entertainment", Akamai Technologies, Inc., 2007, 38 pages.

"ebd Web Video Player, Increase Online Video Ad Monetization", www.ebdsoft.tv, 2010, 2 pages.

(56) References Cited

OTHER PUBLICATIONS

Written Opinion of International Searching Authority dated Nov. 14, 2012 in connection with International Patent Application No. PCT/US2012/52897, 4 pages.
International Search Report dated Nov. 14, 2012 in connection with International Patent Application No. PCT/US2012/52897, 3 pages.
Office Action dated Apr. 10, 2014 in connection with U.S. Appl. No. 14/042,477.
Office Action dated Apr. 11, 2014 in connection with U.S. Appl. No. 14/091,219.
Non-Final Office Action dated Oct. 3, 2011 in connection with U.S. Appl. No. 12/363,713; 9 pages.
Non-Final Office Action dated May 4, 2012 in connection with U.S. Appl. No. 12/434,596; 7 pages.
Final Office Action dated Jun. 13, 2012 in connection with U.S. Appl. No. 12/363,713; 13 pages.
Non-Final Office Action dated Mar. 15, 2013 in connection with U.S. Appl. No. 12/434,569; 9 pages.
Non-Final Office Action dated May 17, 2013 in connection with U.S. Appl. No. 13/753,384; 10 pages.
Final Office Action dated Jul. 18, 2013 in connection with U.S. Appl. No. 12/434,569; 9 pages.
Final Office Action dated Oct. 25, 2013 in connection with U.S. Appl. No. 13/753,384; 15 pages.
Non-Final Office Action dated Nov. 19, 2013 in connection with U.S. Appl. No. 12/434,569; 12 pages.
Non-Final Office Action dated Dec. 20, 2013 in connection with U.S. Appl. No. 13/753,384; 11 pages.
Final Office Action dated Mar. 20, 2014 in connection with U.S. Appl. No. 12/434,569; 11 pages.
Final Office Action dated Jul. 9, 2014 in connection with U.S. Appl. No. 13/753,384; 10 pages.
Final Office Action dated Jul. 21, 2014 in connection with U.S. Appl. No. 14/091,219; 12 pages.
Non-Final Office Action dated Feb. 24, 2015 in connection with U.S. Appl. No. 14/497,686; 13 pages.
Non-Final Office Action dated Mar. 3, 2015 in connection with U.S. Appl. No. 14/079,385; 13 pages.
Non-Final Office Action dated Mar. 27, 2015 in connection with U.S. Appl. No. 14/498,800; 19 pages.
Final Office Action dated May 18, 2015 in connection with U.S. Appl. No. 14/484,047; 10 pages.
Final Office Action dated May 21, 2015 in connection with U.S. Appl. No. 14/484,225; 13 pages.
Final Office Action dated Jul. 1, 2015 in connection with U.S. Appl. No. 14/079,385; 13 pages.
Non-Final Office Action dated Jul. 16, 2015 in connection with U.S. Appl. No. 12/787,505; 15 pages.
Final Office Action dated Jul. 17, 2015 in connection with U.S. Appl. No. 14/484,065; 13 pages.
"Digital Video In-Stream Ad Format Guidelines and Best Practices"; Interactive Advertising Bureau; May 2008; 17 pages.
Reid, et al.: "An Analysis of Anonymity in the Bitcoin System"; http://arxiv.org/pdf/1107.4524.pdf; May 7, 2012; 29 pages.
Notification dated Feb. 16, 2015 in connection with Russian Application No. 2012105917/08 (009063); 7 pages.
Office Action for U.S. Appl. No. 12/787,505, mailed Mar. 1, 2013, 10 pages.
Office Action for U.S. Appl. No. 12/434,569, mailed Oct. 25, 2012, 9 pages.
Office Action for Australian Application No. 2012302021, dated Oct. 22, 2015, 3 pages.
Notice of Acceptance for Australian Application No. 2012302021, dated May 4, 2016, 2 pages.
First Office Action for Chinese Application No. 201280053145.7, mailed Mar. 1, 2016, 3 pages.
Supplementary European Search Report for European Application No. 12828677.0, mailed Sep. 28, 2015, 7 pages.
Office Action for Russian Application No. 2014112353, mailed Feb. 18, 2016, 2 pages.
Office Action for Canadian Application No. 2,877,567, dated Feb. 29, 2016, 5 pages.
Supplementary European Search Report for European Application No. 13806161.9, mailed Jan. 28, 2016, 5 pages.
Office Action for U.S. Appl. No. 13/923,089, mailed Mar. 22, 2016, 11 pages.
Office Action for U.S. Appl. No. 13/923,089, mailed Dec. 2, 2014, 5 pages.
Office Action for U.S. Appl. No. 14/512,204, mailed Dec. 4, 2015, 20 pages.
Office Action for U.S. Appl. No. 14/512,204, mailed Jul. 30, 2015, 21 pages.
International Search Report and Written Opinion for International Application No. PCT/US2014/057597, mailed Jan. 9, 2015, 6 pages.
International Search Report and Written Opinion for International Application No. PCT/US2015/018140, mailed Jun. 3, 2015, 9 pages.
International Search Report and Written Opinion for International Application No. PCT/US2015/019979, mailed Jul. 30, 2015, 10 pages.
Lob, S. et al., "NEMO—The Network Environment for Multimedia Objects," ACM, IITM '10 Proceedings of the First International Conference on Intelligent Interactive Technologies and Multimedia, ISBN 978-1-4503-0408-5, pp. 245-249 (2010) http://doi.acm.org/10.1145/1963564.1963607.
MediaTomb, MediaTomb Scripting [online], Retrieved on Oct. 11, 2015, URL: http://mediatomb.cc/pages/scripting, 24 pages.
Morin, J-H et al., "HyperNews: a commercial electronic newspaper," pp. 147-163 (Nov. 8, 2004).
Office Action for Mexican Patent Application No. MX/a/2014/002490 mailed Jun. 10, 2016 (machine translation).
Office Action for Japanese Patent Application No. 2014-528557 mailed Jul. 26, 2016.

\* cited by examiner

CONTAINERIZED SOFTWARE FOR VIRALLY COPYING FROM ONE ENDPOINT TO ANOTHER

CROSS-REFERENCE TO RELATED APPLICATIONS AND CLAIM OF PRIORITY

The present application is a continuation of U.S. patent application Ser. No. 13/598,443 filed Aug. 29, 2012 which is related to: U.S. Provisional Patent Application No. 61/528,635, filed Aug. 29, 2011; U.S. Provisional Patent Application No. 61/650,917, filed May 23, 2012; U.S. Provisional Patent Application No. 61/650,873, filed May 23, 2012; U.S. Provisional Patent Application No. 61/650,888, filed May 23, 2012; U.S. Provisional Patent Application No. 61/650,897, filed May 23, 2012; U.S. Provisional Patent Application No. 61/650,900, filed May 23, 2012; U.S. Provisional Patent Application No. 61/650,881, filed May 23, 2012 and U.S. Provisional Patent Application No. 61/662,765, filed Jun. 21, 2012. U.S. patent application Ser. No. 13/598,443 and Provisional Patent Application Nos. 61/528,635; 61/650,917; 61/650,873; 61/650,888; 61/650,897; 61/650,900; 61/650,881 and 61/662,765 are owned by the assignee of the present application and are hereby incorporated by reference into the present application as if fully set forth herein.

TECHNICAL FIELD

The present disclosure is directed, in general, to containerized software, and more specifically, to systems and methods for distributing containerized software.

BACKGROUND

Online shopping has increased in recent years. Consumers use technology to simplify the shopping experience to shop from home without needing to travel to the store. Merchants have become increasingly competitive to market their products and services to consumers over the Internet. Traditionally, when a consumer sees an advertisement for a product or desires to purchase something online, the consumer needs to visit the website for the merchant in order to complete the transaction. This may be undesirable in certain situations. For example, consumers may not wish to be distracted by advertisements or may not wish to leave the website that they are viewing in order to purchase something. As a result, online sales potential is diminished due to lack of convenience from the consumer perspective. Additionally, hosts of the website the consumer is viewing may not want consumers to leave their website to go transact business elsewhere.

Videos and other types of media are often popular among viewers. Websites, such as YouTube, allow users to post videos for others to view. Some videos gain popularity that can be tracked through number of views or "hits."

Monetization of media content can present challenges even despite the popularity of the video. For example, some websites provide advertising that is displayed prior to the video or elsewhere on the webpage. Such advertisements may interfere with the video content and may annoy viewers. While website advertisement may generate some revenue, that revenue is often primarily retained by the website hosting the video content. This results in a dynamic where the website doing the hosting profits financially while the creators of the video content, although gaining notoriety, often struggle to see a return on investment.

Accordingly, there is a need for methods, systems, devices and computer readable media that take into account one or more of these issues and possibly other issues as well. For example, there is a need to bring the store to the consumer.

SUMMARY

According to various embodiments of the present disclosure, methods, systems devices and computer readable media are disclosed for enabling containerized software.

In one embodiment, a method is provided for including objects with media content. The method includes receiving, at one or more servers, a request for the media content to be displayed at an endpoint. The method includes identifying information about an environment associated with the endpoint. The method includes identifying a set of objects to include in a container for the media content based on the information identified about the environment. At least one of the objects includes program code for completing an electronic commerce transaction during display of the media content. Additionally, the method includes sending, by one or more servers, the set of objects to the endpoint.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an example display of the video clip in FIG. 3 displayed in a display unit for a container in a webpage in accordance with one embodiment of the present disclosure;

FIG. 11 illustrates an example display of the shipping address entry interface in FIG. 8 displayed in the display unit for the container in a webpage in accordance with one embodiment of the present disclosure;

DETAILED DESCRIPTION

FIGS. 1-17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
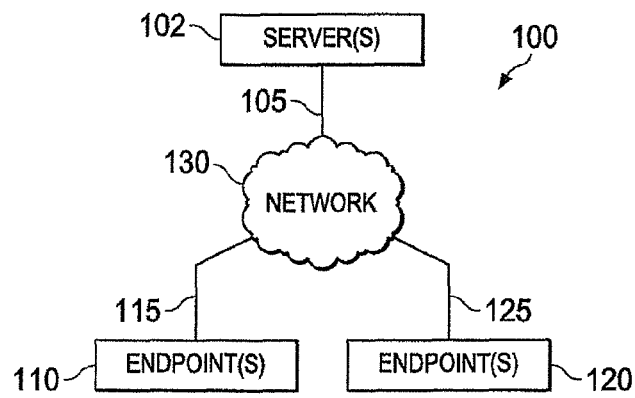
FIG. 1 illustrates a block diagram of a communication system that can be utilized to facilitate communication between endpoint(s) through a communication network in accordance with various embodiments of the disclosure.

FIG. 1 illustrates a block diagram of a communication system 100 that can be utilized to facilitate communication between endpoint(s) 110 and endpoint(s) 120 through a communication network 130, according to particular embodiments of the disclosure. In various embodiments, server(s) 102 may be utilized to facilitate communication between endpoint(s) 110 and endpoint(s) 120. As used herein, "endpoint" may generally refer to any object, device, software, or any combination of the preceding that is generally operable to communicate with another endpoint. The endpoint(s) may represent a user, which in turn may refer to a user profile representing a person. The user profile may comprise, for example, an address for the user, a user name, a pass code, other user information, or any combination of the preceding. Additionally, the endpoint(s) may represent a device that comprises any hardware, software, firmware, or combination thereof operable communicate through the communication network 130. The server(s) 102 are one or more computers or programs running on one or more computers that are capable of performing a request received from another computer or program. Examples of server(s) include applications servers, enterprise servers, and web servers.

Examples of an endpoint(s) include, but are not necessarily limited to, a computer or computers (including servers, applications servers, enterprise servers, desktop computers, laptops, net books, tablet computers (e.g., IPAD)), a switch, mobile phones (e.g., including IPHONE and Android-based phones), networked televisions, networked disc players, components in a cloud-computing network, or any other device or component of such device suitable for communicating information to and from the communication network 130. In various embodiments, the endpoint(s) 110 and 120 may be a website or email message. Endpoints may support Internet Protocol (IP) or other suitable communication protocols. Endpoints may additionally include a medium access control (MAC) and a physical layer (PHY) interface that conforms to IEEE 801.11. If the endpoint is a device, the device may have a device identifier, such as the MAC address, and may have a device profile that describes the device.

The communication network 130 and links 105, 115 and 125 to the communication network 130 may include, but is not limited to, a public or private data network; a local area network (LAN); a metropolitan area network (MAN); a wide area network (WAN); a wireline or wireless network (GSM, CDMA, LTE, WIMAX, or the like); a local, regional, or global communication network; portions of a cloud-computing network; a communication bus for components in a system; an optical network; a satellite network; an enterprise intranet; other suitable communication links; or any combination of the preceding. In particular embodiments, portions of the links 115, 125 or communication network 130 may be on the Internet.

Although an endpoint generally appears as being in a single location, the endpoint(s) may be geographically dispersed, for example, in cloud computing scenarios. As used in this document, "each" may refer to each member of a set or each member of a subset of a set.

When the endpoints(s) 110 and 120 communicate with one another, any of a variety of security schemes may be utilized. As an example, in particular embodiments, endpoint(s) 110 may represent a client and endpoint(s) 120 may represent a server in client-server architecture. The server and/or servers may host a website, and the website may have a registration process whereby the user establishes a username and password to authenticate or log into the website. The website may additionally utilize a web application for any particular application or feature that may need to be served up to the website for use by the user.

Embodiments of the present disclosure provide innovative new methods for merchants to reach their customers online. In the traditional online sales model, merchants need to create search or display ads which show up when online consumers visit search engine sites or various web properties. If the consumer sees an interesting ad related to a product or service, they need to leave their current activity and visit some other web destination to discover more information or make online purchases. Consumers have specific online behavior patterns. If they are actively shopping, then the traditional multistep model is workable. The traditional advertising sales model requires that the consumer stop what they are doing and visit some other online destination. However, if they are on a social site interacting with friends, reading the news, playing games, or engaged in other online activities, they are much less likely to leave their current activity to visit some external Internet destination.

Various embodiments of the present disclosure bring the product information or store to the consumer. Various embodiments of the present disclosure utilize an innovative new Smart Container™ code/technology that virally syndicates across the web, for example, using components described with reference to FIG. 1 or using other components. The Smart Container™ code/technology is ideal for those types of destinations that online consumers tend to frequent, such as social networks and blogs. Regardless, if the Smart Container™ code is located on a web page, a blog article, a social network page or wall, or a mobile device, a user can complete their transaction right there with no need to be diverted to some external destination.

Figure 2:
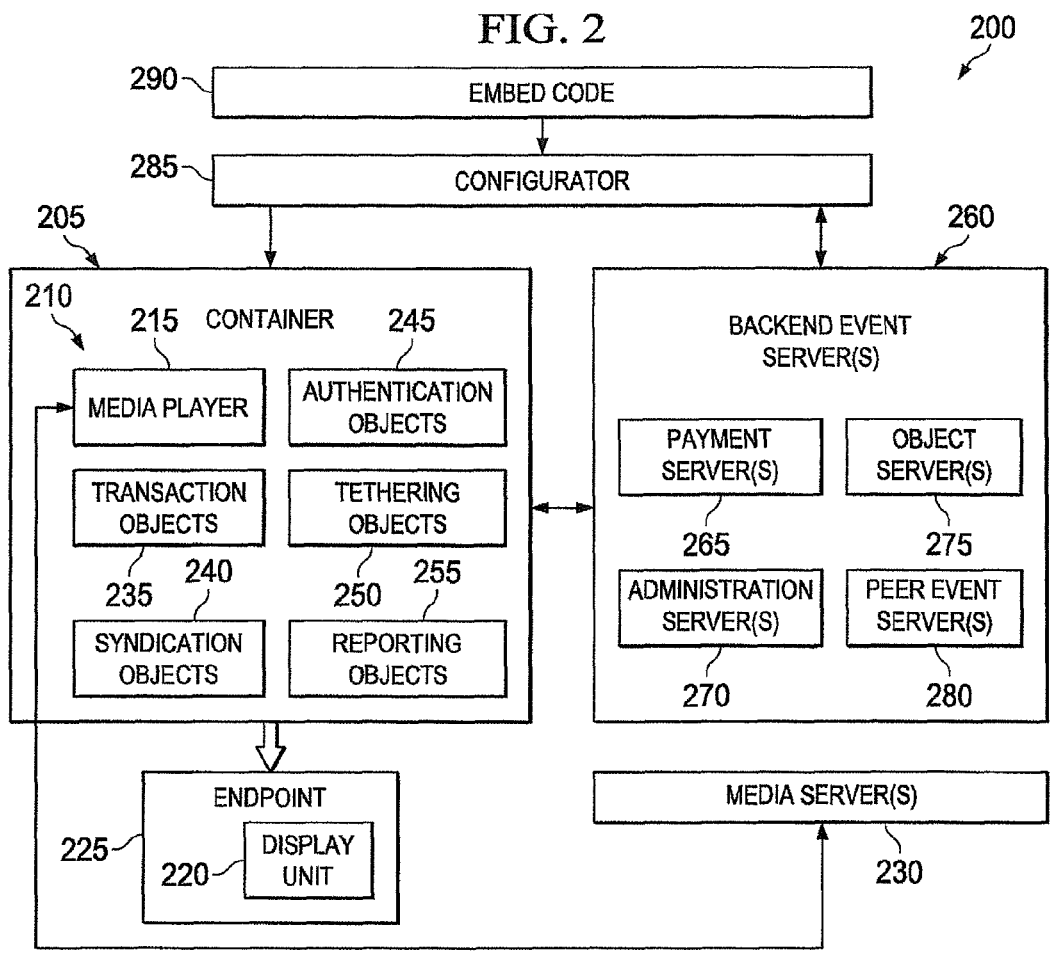
FIG. 2 illustrates a block diagram of a container management environment that may be utilized to virally syndicate and propagate a container across the Internet in accordance with various embodiments of the present disclosure.

FIG. 2 illustrates a block diagram of a container management environment 200 that may be utilized to virally syndicate and propagate a container across the Internet in accordance with various embodiments of the present disclosure. The container 205 is program code that virally syndicates and propagates objects 210 across the web and other connected network and mobile devices. The container 205 is a new type of software entity that performs a task in a distributed fashion while adapting and configuring to the user's environment. The container 205 may not be created by a web site author, but an independent object that can perform in multiple different environments. The container 205 can be deployed by anyone, a blogger, email campaign, etc. The container 205 does not need to be purpose built into the website or program code to work.

Shopping and marketing experiences can be enhanced when interactive media is used. The container 205 serves up interactive media to users. For example, one of the objects 210 in the container 205 is a media player 215. The media player 215 includes instructions and parameters for rendering or otherwise displaying media content in a display unit 220 located at the endpoint 225. The media player 215 displays or streams media content from media server(s) 230 in the display unit 220 at the endpoint 225. For example, the media player 215 may reference a URL or other location to stream media content from the media server(s) 230. In some examples, the media player 215 may stream content from websites, such as YouTube™. Examples of media content that may be displayed include video data (such as video clips and animation), image data (e.g., still images from the video data, advertisements, pictures of goods or services, etc.) and audio data (e.g., narration or marketing content associated with the video data or the image data, music or songs). Various embodiments recognize that one of the most appealing forms of media for sales and shopping is video. Video allows a much more lifelike representation than text or static pictures. Video also creates a rich product browsing or shopping experience.

In various embodiments of the present disclosure, the container 205 supports many different types of transactions. For example, the container 205 can be configured in a variety of ways to address an entire value chain of online marketing and shopping. The value chain of online marketing and shopping includes impressions, clicks (e.g., enticing a viewer to click on an object and be directed to a different website or to different content within the container 205), lead generation (e.g., submitting personal information with a request for offers of products or service), and performing electronic commerce transactions. Electronic commerce is the buying and selling of products or services over computer networks, such as the Internet. Electronic commerce transactions are transactions associated with electronic commerce. In non-limiting examples, electronic commerce transactions include the purchase or sale of goods and services and donation of items of value (e.g., money, goods or services) to an organization (e.g., a charity, campaign, cause, etc.). In other non-limiting examples, electronic commerce transactions may encompass activities (such as impressions, clicks or lead generation) that lead up to other electronic commerce transactions (such as the purchase or sale of goods and services).

The container 205 includes transaction objects 235 to support the different types of transactions. The transaction objects 235 include code for marketing and completing transactions within the container 205. For example, the transaction objects 235 may include images and information about a selection of products or services being offered, data for competing payment transactions, an electronic shopping cart and/or other data for completion of electronic commerce transactions. The media content, such as video clips, may be displayed by the media player 215 at one of the endpoints to allow a consumer to learn more about the products, services or transactions supported by the container 205. The consumer can select any of these offered items to get more details (e.g., using the transaction objects 235), all enclosed within the container 205.

The syndication objects 240 include code for allowing a user to share, embed or otherwise send a container to another endpoint. For example, the syndication objects 240 include code for allowing a user to share the media content (and consequently the objects accompanying the media content in the container 205) on a social website, embed within a webpage or send the container 205 (or at least a link (e.g., uniform resource locator (URL)) for the container) via an electronic message (e.g., email, text message, instant message).

The authentication objects 245 include program code for allowing a user of the endpoint 225 to authenticate or login to an account associated with the container 205. The authentication objects 245 may provide a user interface for a user to login or may automatically log a user in based on a combination of one or more of user settings, device recognition, and/or data stored in a cookie. The account may be a user account for the provider of the container or the merchant associated with the container. For example, the account may be used for easy payment processing of transactions or a distributed shopping cart, as will be described in greater detail below. If the user selects to share the container 205, the authentication objects 245 may include information about the user sharing the container 205 for data tracking analytics and/or identifying information about which objects to include in the syndicated container.

The tethering objects 250 include program code for tethering the container 205 with another container at another endpoint. The tethering objects 250 enhance the shopping experience for different users. The tethering objects 250 enable a shared container experience between two or more different users. For example, the tethering objects 250 may synchronize the display of the media content, allow users to share purchases or a shopping cart, provide an interface for text, voice and/or video chat between the users.

The reporting objects 255 include program code for keeping track of information about the container 205. For example, the reporting objects 255 may report information on clicks, impressions, lead generation, product sales, donations, users, syndication paths, syndication locations, and/or any other reportable metrics for merchants and/or container providers to track and improve container performance. The description of the objects 210 included in the container 205 is not intended to be exhaustive or limiting. Any other suitable types of objects may be included in the container 205.

Because the code for the container 205 handles all the complexity, in some embodiments, the container 205 can turn a simple web site into an instant e-commerce store. The container 205 enables users to transact online without having to deal with the complexity of setting up an e-commerce site. For merchants with an e-commerce site, the container 205 readily enables a rich shopping experience with the interaction between the media content and transaction objects 235. In non-limiting examples of a creative hobbyist or local band, the container 205 allows the user to readily sell directly to interested consumers. In some embodiments, the transaction objects 235 may include offers in the container 205 for custom merchandise. For example, merchants can custom design a selection of apparel with their art and graphics to be sold along with their own creations. Some embodiments may dynamically produce and ship the custom apparel for the merchant, eliminating the need to manage inventory, and providing online customers with a richer line of products. Because the e-commerce store uses the container 205, the e-commerce store can also propagate out onto all forms of viral syndication methods as well.

These offered items (products or services) may be items being advertised or sold. Depending on the type, the container 205 may allow the consumer to request to be contacted, or even purchase the object, within the container 205. The consumer need not leave their current activity or web page. The offered items could also include getting discounts or coupons. The offered items may even be an opportunity to donate to a charity or political campaign. In certain instances, it does make sense to visit another Internet designation, and if appropriate, the consumer can be linked there as well.

The objects 210 in the container 205 are supported by backend event server(s) 260. The objects 210 are individual applications (e.g., mini apps or applets) that provide the functionality for implementing the container 205. The objects 210 are intelligent and lightweight, which improves the transferability of the container 205 while allowing the container 205 to implement tasks in a dynamic and effective manner. The objects 210 may not include everything necessary for handling all the tasks required. The objects 210 may communicate with one or more servers in backend event server(s) 260 to complete tasks in the container 205.

For example, to process a transaction, the transaction objects 235 may securely send payment information to payment server(s) 265. In other examples, the transaction objects 235 or authentication objects 245 may send information about impressions, clicks, shares, and/or user login information to admin server(s) 270 for reporting and analytics. In other examples, all the objects needed for the container 205 may not be initially provisioned. For example, to keep the container initially lightweight, identifiers or locations for objects may be included in the container 205 initially with the objects later provisioned by the objects server(s) 275. In another example, certain objects may be provided in the container 205 based on initial information about the endpoint 225 (e.g., object selection based on assumed device type, website location, or programming language). Upon recognition that additional or different objects should be included in the container 205, the objects server(s) 275 may provision the additional or different objects for improved container experience at the endpoint 225. Peer event server(s) 280 may send and receive information from objects to handle information related to sharing and purchases. For example, the peer event server(s) 280 support tethering events, such as notification of video clip views, purchases, and/or user messaging.

The container 205 can virally syndicate across the Internet following the more popular network paths. The container 205 can be hosted on traditional web pages, blogs, contained in emails, operate on mobile devices, or propagate social networks. Because the container 205 code is flexible, the container 205 can also be set up in the form factor of a display ad unit and distributed via ad servers on display advertising networks. When the code for the container 205 exists on social networks like Facebook™, the container 205 can ride the wave of user "likes". For example, if a woman shopper likes some great shoes shown in a video in the container 205, the container 205 code can propagate directly to their "wall." Now all her friends see the video and products in the container, and can view or transact right there on their own wall. Of course, if any of their friends also "like" it, the container 205 code propagates and rides the wave further out into that branch of the social network yielding a potential exponential growth factor. In other examples, the container 205 objects may support a politician running for office. Their supporters may be passionate about the message and "like" it, again making it available to their network. Now, similarly minded political supporters can view those messages too, and if so moved may donate to the cause within the container 205. In another example, such as sports, a sports fan may wish to watch that content on their HD large screen TV. More and more have interconnected devices, such as a Roku™, and a container 205 code could exist on such an IP TV box as well, enabling the sharing of a container 205 in a variety of Internet connected devices.

Another form of tracking relates to how the container 205 is propagated. A merchant may wish to use affiliates to help syndicate the container 205 and pay a percentage based on the transactions resulting from their work. The container 205 objects can be tagged with affiliate tracking identifiers allowing status reports and transactions from that container instance or its descendants to be properly filtered. Another tracking usage may be for a politician to assign affiliate codes to their supporters and be able to measure whose efforts result in the most new supporters.

The container 205 is a smart container in that the container 205 is capable of customizing automatically based on the environment to which the container 205 is propagated. For example, the objects 210 included in the container 205 may be configured or selected in real-time based on different criteria. The container 205 is generated by the configurator 285 when the configurator 285 receives a request for the container 205, such as an embed code 290. The configurator 285 is a backend service or application that runs on a server (e.g., one or more of the server(s) 102 in FIG. 1). The configurator 285 generates the container 205 by identifying the objects 210 to include in the container 205.

The environment associated with the endpoint 225 where the container is being propagated to is one example of criteria that may be used to select or otherwise configure the objects 210 included in the container 205. For example, the configurator 285 may identify this environment information from the embed code 290. The embed code 290 is a request for the container 205 that includes information, such as, for example, without limitation, an identifier of the container 205 being propagated, an originating Internet Protocol (IP)

address, a time the request was sent and/or received, reference codes, such as a requester identifier, merchant identifier, website (e.g., URL) where the embed code 290 was sent from and/or is requesting the container 205 be rendered at, and/or other information that may be identified about the environment where container 205 renders. From the IP address and/or the website information, the configurator 285 may identify a location of the endpoint 225, a type of device (e.g., mobile device, computer, etc.) of the endpoint, the website (e.g., stand alone web page, embedded within a webpage, displayed on a social website) for the endpoint and/or other information about the environment.

In some examples, if the device is a traditional PC or laptop, the configurator 285 will include objects for the container 205 to render using the optimal technology or rendering parameters, which, for this purpose, may be flash video. On mobile devices, such as IPhones, IPads, or Android phones, the rendering parameters may be selected as HTML5 or a native interactive app. Based on the information about how the content should be rendered, configurator 285 includes the appropriate objects for the media player 215 to render properly for the environment. Beyond device type, there are other dimensions of customization. Smaller devices and some environments, such as a social site, restrict window sizes, so the media player 215 in the container 205 adapts to properly render the media content.

In other examples, the configurator 285 may identify which products to advertise or ways to customize the media content based on the location of the endpoint 225, which can be identified from the IP address. For example, the container 205 can provide different content customized based on geo-location. In one example, if the location of the endpoint is in a cold climate, objects in the transaction objects 235 may be selected to offer appropriate seasonal products with the media content. In other examples, the media content may be customized based on the location. For example, text associated with the media content and the transaction objects 235 may be selected based on a language commonly spoken at the location. In other examples, the media content may be selected to appeal to location preferred sports teams, activities, etc.

As other examples of criteria that may be used to select or otherwise configure the objects 210 included in the container 205, the configurator 285 may communicate with backend event server(s) 260 to identify the objects to identify objects to include in the container 205. For example, the configurator 285 may identify products to market or video clips to send based on merchant information accessible via the admin server(s) 270. For example, the status of a marketing campaign may be used to select or otherwise configure the objects 210 and media content included in the container 205. The objects in the container 205 may be updated and/or selected based on real-time information about successes and failures based on information about the marketing campaign. For example, embodiments of the present disclosure track sales data and video propagation data, such as what video clips are popular, and/or a demographic of the viewers syndicating or viewing the media content. The server(s) 102 in FIG. 1 may identify which products to advertise at what location and what video clips to select, based on the sales data or the video propagation data. Based on this, the server(s) dynamically select which objects to place within the container 205 that is sent to the endpoint.

The admin server(s) 270 can track data on how a merchant campaign is performing and when merchants launch and syndicate their container 205 code onto the Internet. For example, the reporting objects can report back the status on events and transactions of interest, (e.g., how many impressions, video views, clicks, leads, sales have occurred). All such statuses can be sent back as events occur, providing details on how they are doing. Because the containers 205 are smart, the server(s) can instruct the container 205 to change behavior, offer different clips, update products, or to stop the marketing or sales campaign.

The objects in the container 205 code know about each other in certain embodiments. When a video is playing, the container 205 can update the product and service objects being shown that correspond with the particular sequence in a video segment. The container 205 allows a shopping channel to be created and syndicated across the Internet.

The code for the container 205 is designed to be highly scalable in particular embodiments. Rather than burden a single website with massive traffic which would result from a traditional model of bringing all consumers to the store, the code for the container 205 operates in a distributed manner. In particular embodiments, the code for the container 205 executes at the endpoint 225, (e.g., on a blog, social network or mobile device). The container 205 can fetch the instructions when stated, and then gather product items and video streams from a worldwide distributed content delivery network (e.g., the network 130). This results in highly scalable architecture allowing millions of concurrent consumers.

Although the container 205 has been described with media content and objects 210, such media content and objects 210 may not all be sent to an endpoint at the same time or as a bundle. Rather, in particular embodiments, information concerning the container may initially be stored on, for example, a server accessed by the endpoint. Then, when the endpoint requests the information for the container, additional information can be dynamically pushed to the endpoint or pulled from the endpoint (e.g., by the server sending a pointer to the endpoint).

By utilizing such a dynamic push/pull scenario, a single container 205 can be modified over time. As a simple example, a price may be associated with an item for sale at a point in time; however, when that point in time changes, the price for that item may change. Although the price changes, the initial information for requesting the container 205 does not change. Further examples of dynamic content will be described below.

Figure 3:
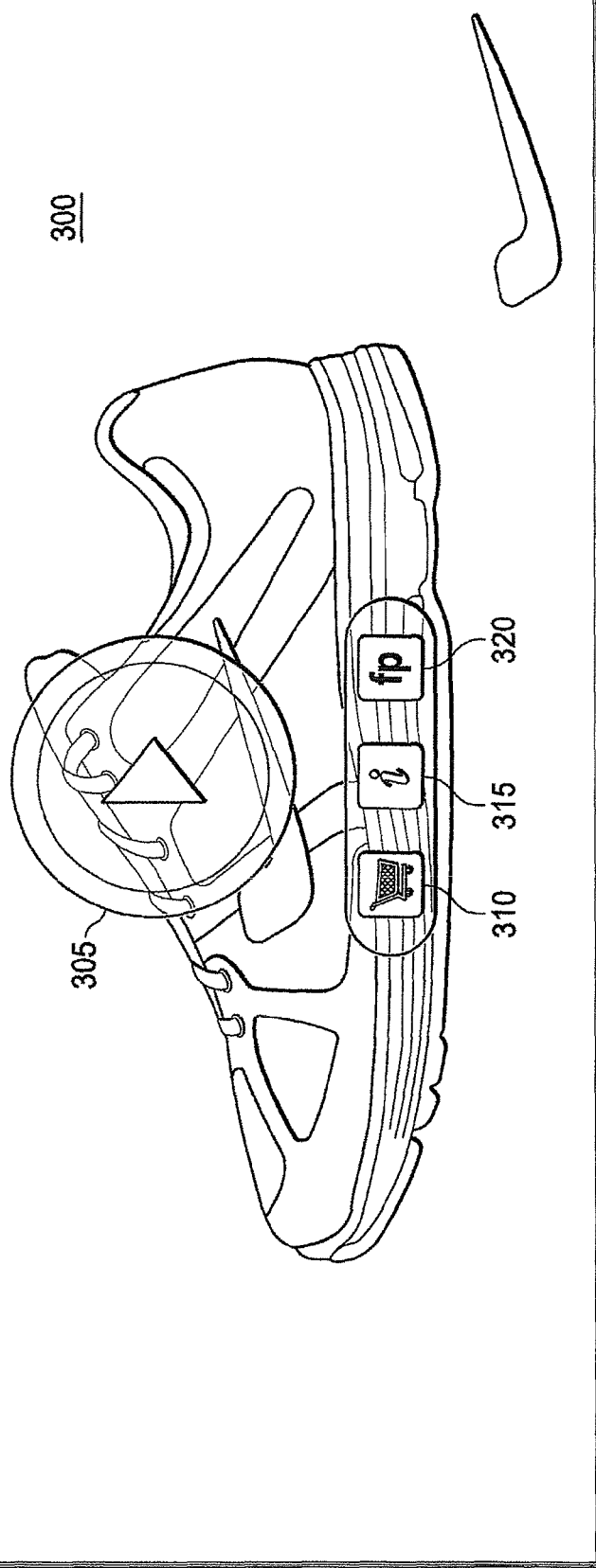
FIG. 3 illustrates an example display of media content in a display unit for a container at an endpoint in accordance with one embodiment of the present disclosure.
Figure 4:
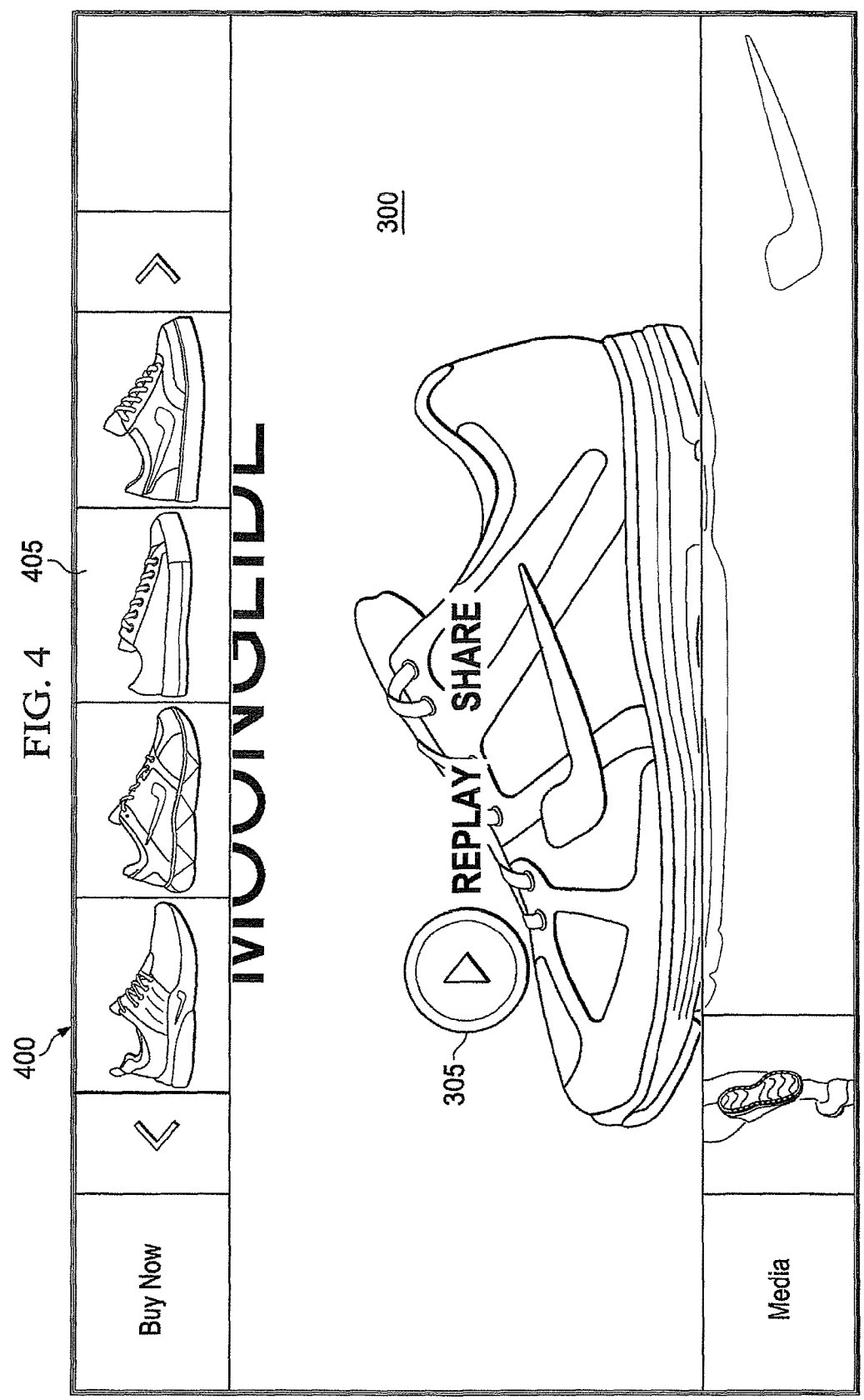
FIG. 4 illustrates an example display of a ribbon including for purchase within a video in accordance with one embodiment of the present disclosure.

FIGS. 3-14 are screen shots illustrating various example embodiments of functionality of the container 205. FIGS. 3-14 are intended as examples of features of various embodiments of the present disclosure. FIG. 3 illustrates an example display of media content in a display unit for a container at an endpoint in accordance with one embodiment of the present disclosure. For example, in FIG. 3, a video clip 300 for a shoe is displayed within a frame for a container (such as container 205). The video clip 300 can be played by selection of the play button 305. A user can access a shopping cart via shopping cart button 310, find out information about the video via info button 315, and share the video via the share button 320. FIG. 4 illustrates an example display of a ribbon 400 including items 405 for purchase within the video clip 300 in accordance with one embodiment of the present disclosure.

Figure 5:
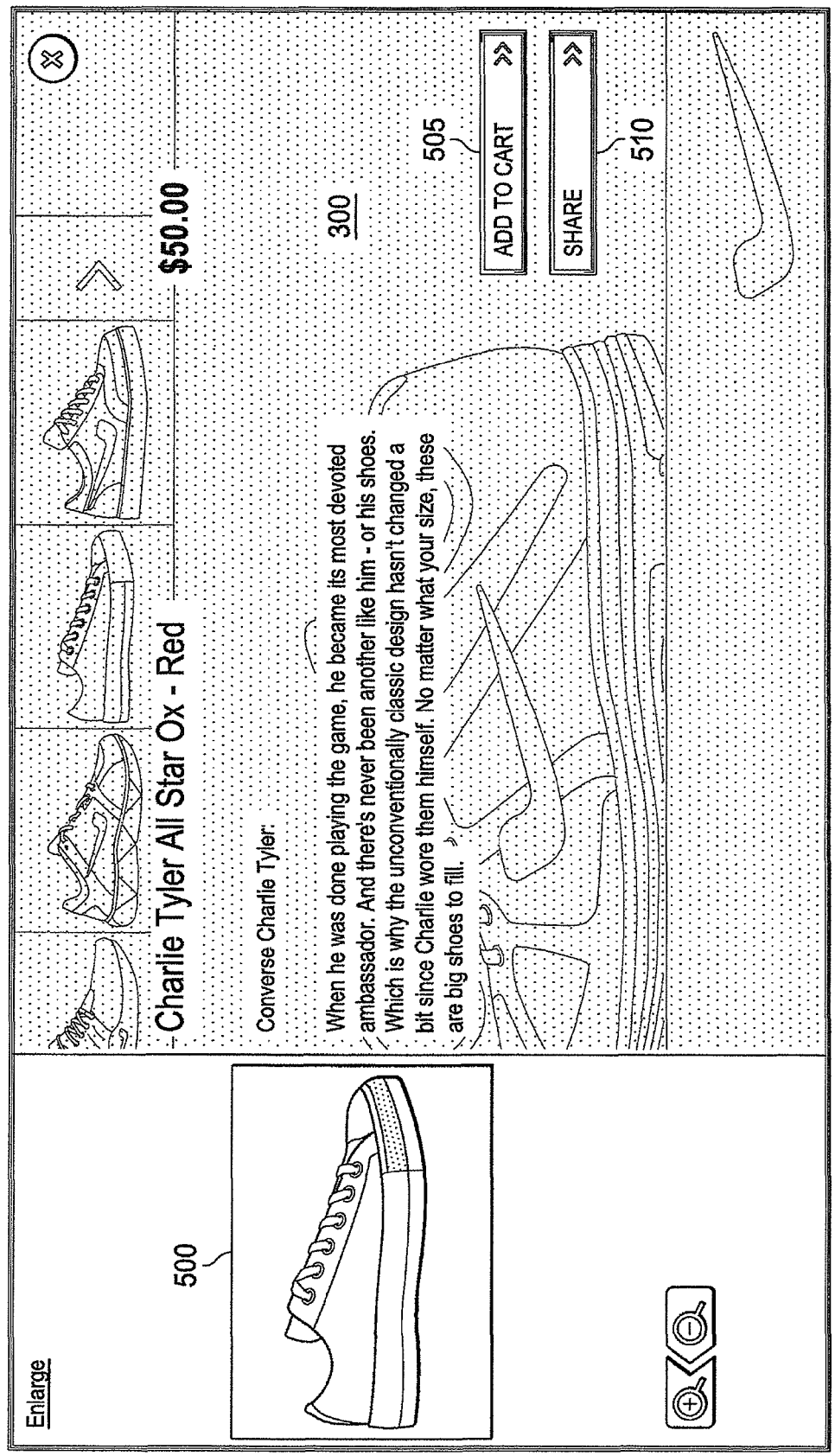
FIG. 5 illustrates an example display of information about a selected item in accordance with one embodiment of the present disclosure.

FIG. 5 illustrates an example display of information about a selected item in accordance with one embodiment of the present disclosure. For example, while watching the video clip 300, the viewer may wish to purchase or inquire about purchasing a shoe featured in the video clip 300. Upon selection of an image of the item 500 from the items 405 in the ribbon 400, the container 205 operating at the endpoint generates a display of information about the item 500 within the same display unit 220 for the video clip 300. For example, a user can view information about the item 500 with options to add to the user's cart (e.g., "add to cart" button 505) or to share the item (e.g., share button 510). The user is able to view information about the item 500, add to cart and share the item all within the container 205 while watching the video clip 300.

Figure 6:
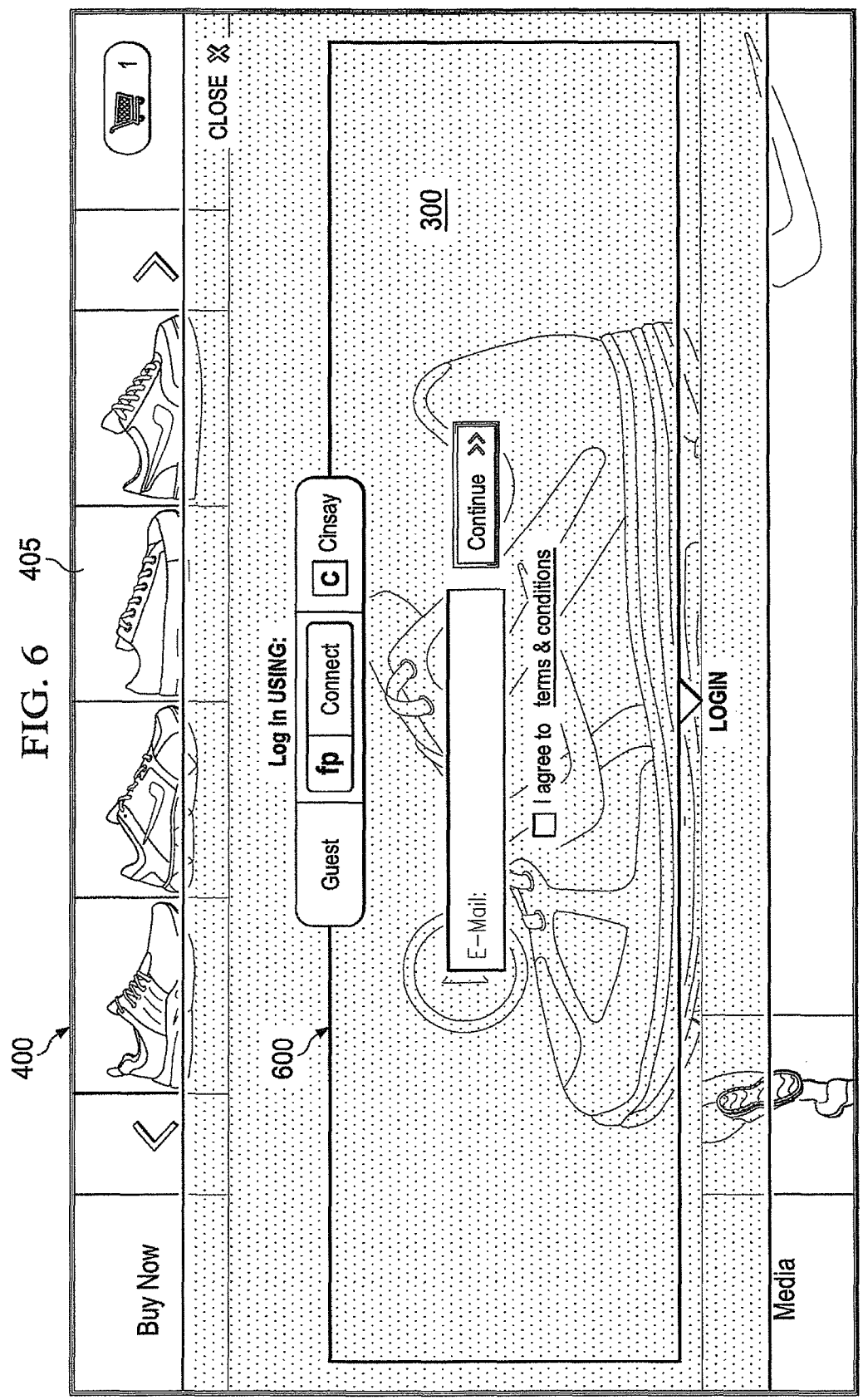
FIG. 6 illustrates an example display of an interface for logging into an account in accordance with one embodiment of the present disclosure.

FIG. 6 illustrates an example display of an interface 600 for logging into an account in accordance with one embodiment of the present disclosure. In this illustrative example, a user may log into an account to purchase items all within the container 205 while watching the video clip 300. For example, the login interface 600 in FIG. 6 may be generated by the authentication objects 245 in FIG. 2.

Figure 7:
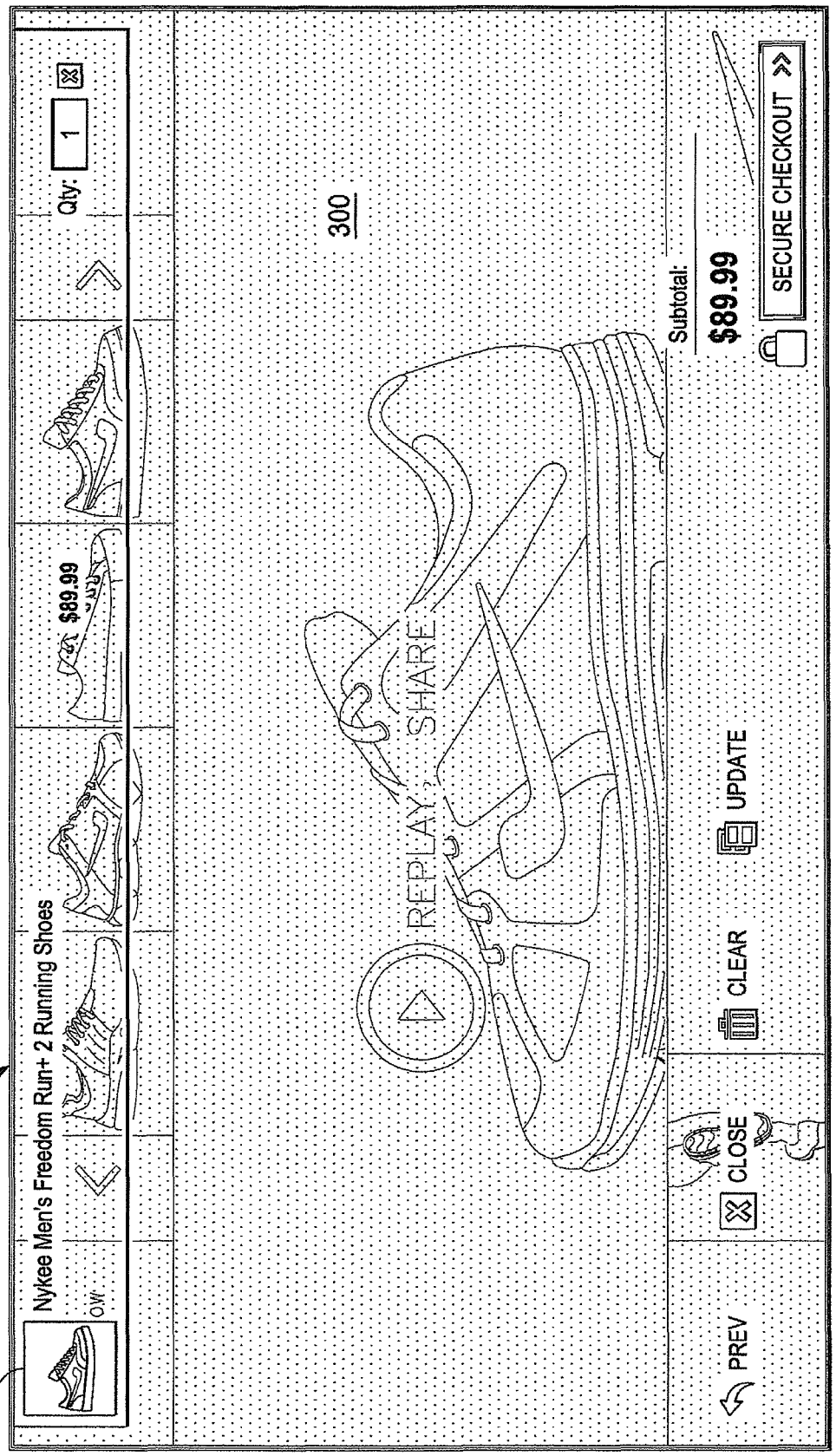
FIG. 7 illustrates an example display of a checkout interface for an item in the user's cart in accordance with one embodiment of the present disclosure.
Figure 8:
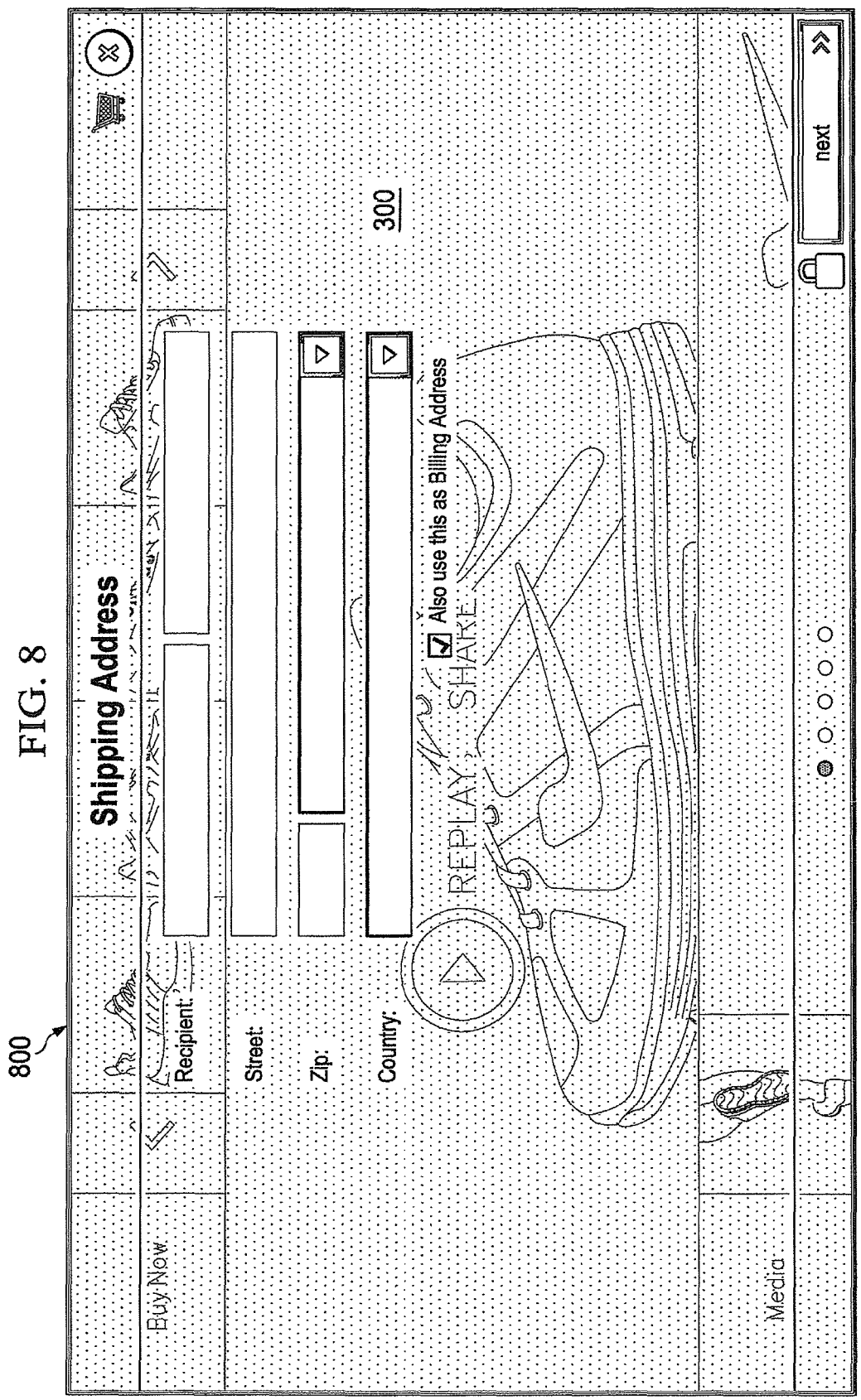
FIG. 8 illustrates an example display of a shipping address entry interface allowing a user to input shipping information in connection with a purchase transaction in accordance with one embodiment of the present disclosure.

FIGS. 7 and 8 illustrate the purchase of an item within a display unit for a container. FIG. 7 illustrates an example display of a checkout interface 700 for an item 705 in the user's cart in accordance with one embodiment of the present disclosure. The checkout interface 700 allows a user to purchase an item or items in the user's cart within the container 205 while watching the video clip 300. FIG. 8 illustrates an example display of shipping address entry interface 800 allowing a user to input shipping information in connection with a purchase transaction in accordance with one embodiment of the present disclosure. The container 205 can generate and present similar interfaces for other stages of the purchase transaction (e.g., payment, authorization, login, etc.). The container 205 enables the user to complete an entire transaction within the container 205 while watching the video clip 300. In other embodiments, authentication objects 245 may authenticate a user and retrieve stored payment or shipping information of the user that can expedite the payment process. For example, the shipping address entry interface 800 is part of one example embodiment of the container 205 and may not be displayed in some embodiments.

Figure 9:
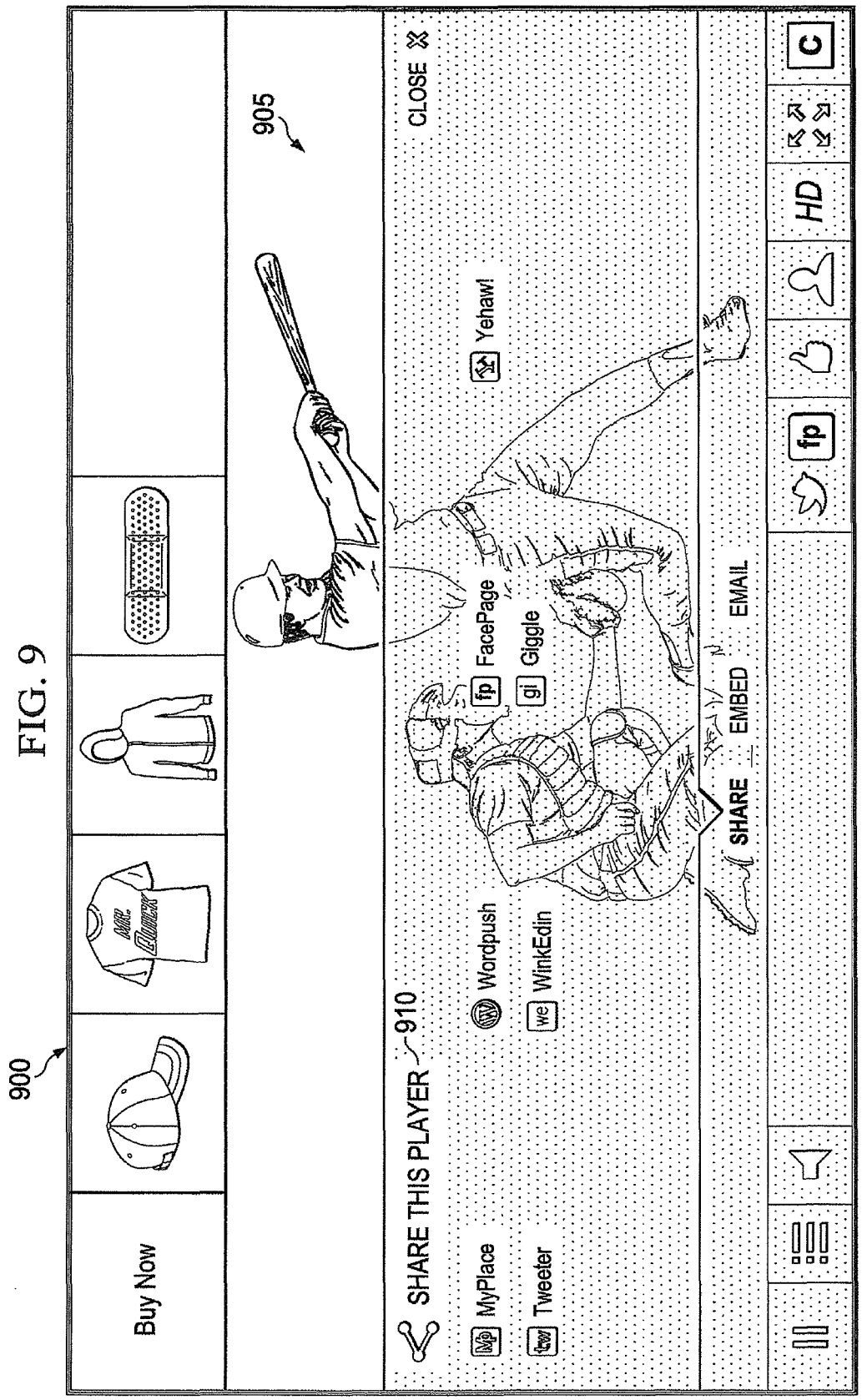
FIG. 9 illustrates an example sharing interface for sending a video clip with a container in accordance with one embodiment of the present disclosure.

FIG. 9 illustrates an example sharing interface 900 for sending a video clip 905 with a container in accordance with one embodiment of the present disclosure. The sharing interface 900 illustrated in FIG. 9 is a screen capture of a video clip 905 being played at one endpoint 110 with a display of options 910 for sending the video clip 905 (and consequently the container 205) to another endpoint 120. For example, a viewer watching the video clip 905 may select to share the video clip 905 on a website, such as a social network website. In response to such a selection, the code for the container 205 (e.g., the syndication objects 240) may generate a display of sharing options 910 listing websites where the video clip 905 and container may be shared. In other examples, the code for the container 205 (e.g., the syndication objects 240) allows the viewer to embed within a webpage or send the container 205 via email. All of these options 910 for sending, propagating or otherwise virally syndicating the video clip 905 can be completed while watching the video clip 905 within the display unit 220 for the video clip 905 and without needing to be directed to another webpage.

Figure 10:
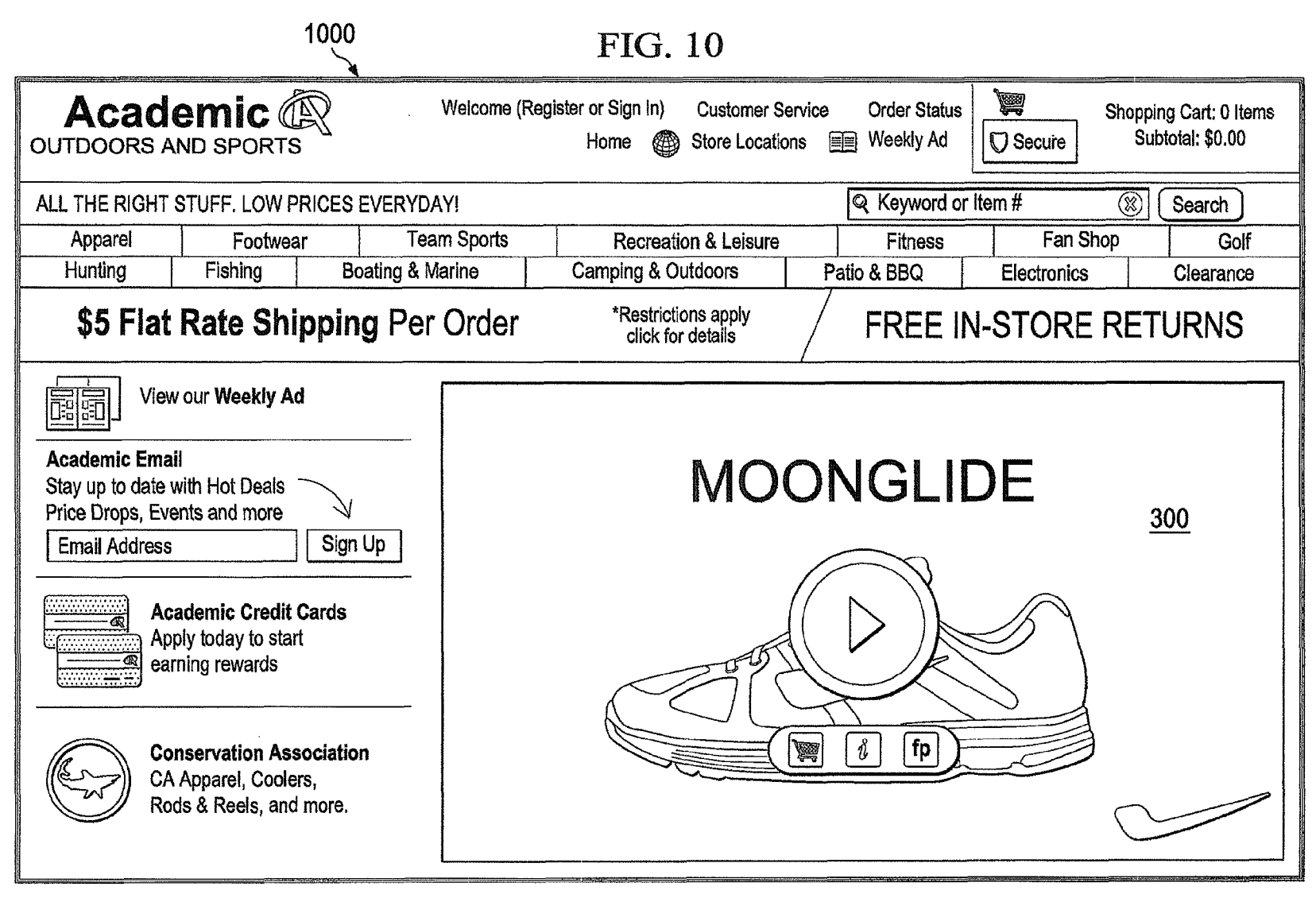
Figure 11:
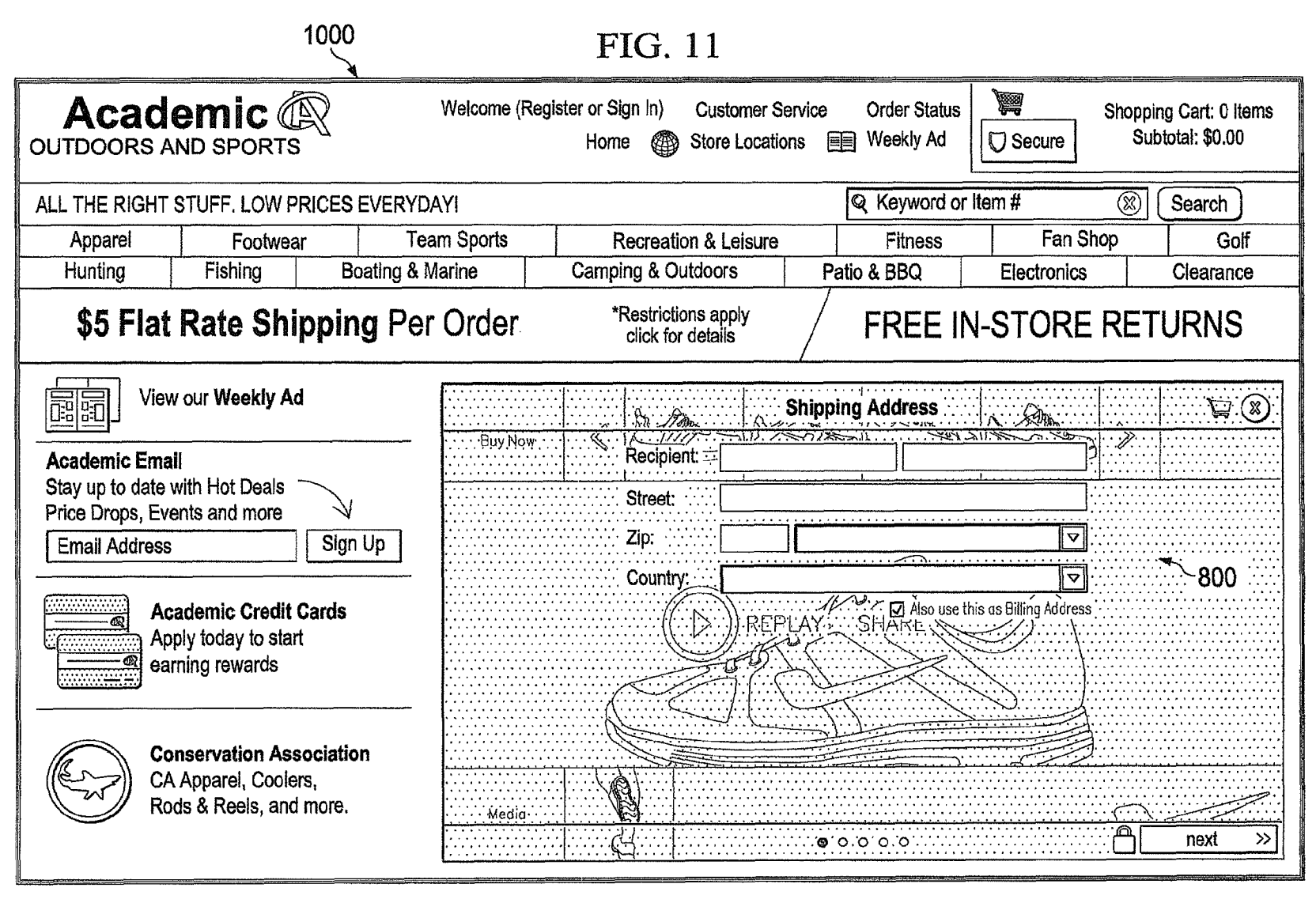

The container 205 can be implemented in a variety of different environments. FIGS. 10-14 provide exemplary screen shots of the container 205 implemented in different environments. The illustrations provided in FIGS. 10-14 are indented as illustrative examples and not intended to be exhaustive or imply any structural or physical limitation to the various embodiments of the present disclosure. FIG. 10 illustrates an example display of the video clip 300 in FIG. 3 displayed in a display unit for a container in a webpage 1000 in accordance with one embodiment of the present disclosure. As illustrated in FIG. 10, the container 205 can be implemented in the web page 1000 in a browser on a computer, such as a desktop or laptop computer. FIG. 11 illustrates an example display of the shipping address entry interface 800 in FIG. 8 displayed in the display unit for the container in the webpage 1000 in accordance with one embodiment of the present disclosure. For example, as illustrated in FIG. 11, the container 205 enables a user to complete an entire transaction within the display unit 220 for the container 205 while watching the video clip and without needing to be directed to another webpage.

Figure 12:
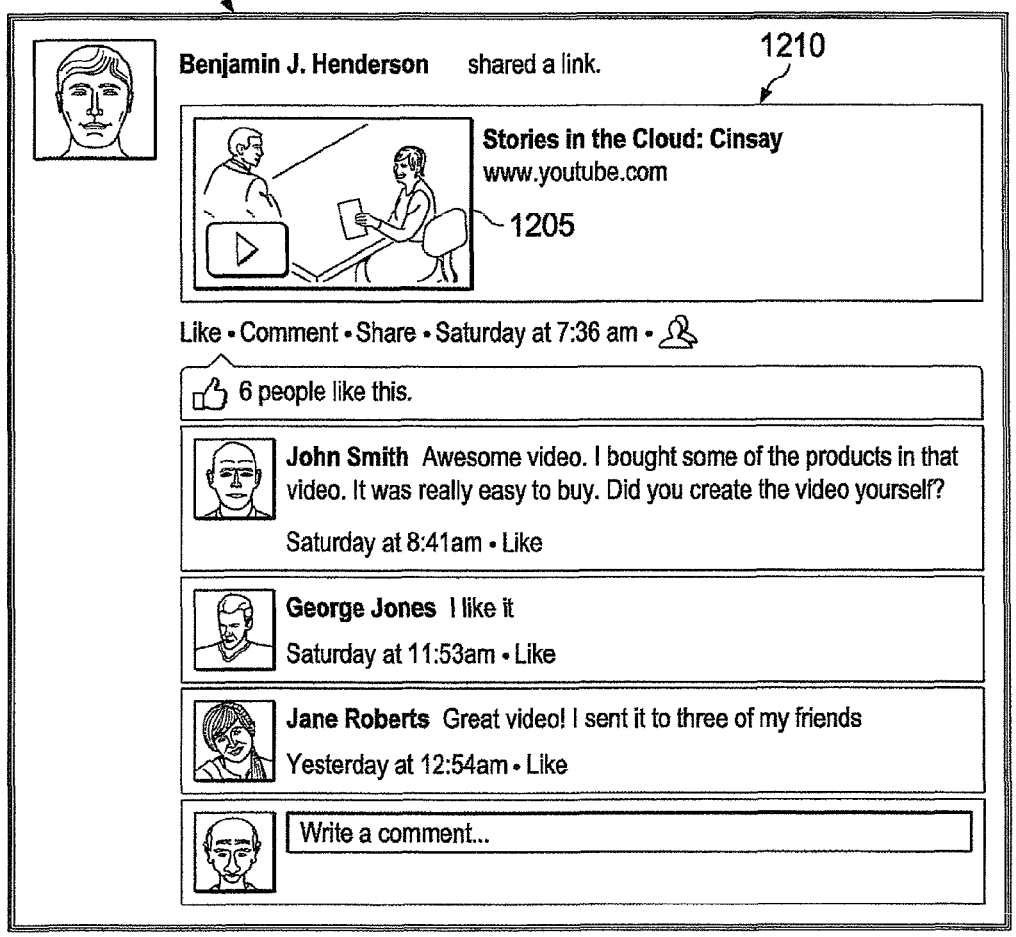
FIG. 12 illustrates an example display of a container implemented within a social media website in accordance with one embodiment of the present disclosure.

FIG. 12 illustrates an example display of a container implemented within a social media website 1200 in accordance with one embodiment of the present disclosure. As depicted in FIG. 12, the container 205 customizes itself to adapt to and render in the environment to which the container 205 is propagated. As illustrated, the container 205 has adapted to display a thumbnail image 1205 for a video clip within a wall 1210 on the social media website 1200. For example, a user may share a link to the video clip via the social media website 1200. The container 205 then customizes itself to display in line with the wall of the user. Upon selection of the video clip by another user, that other user is enabled to watch the video clip and complete transactions all within the container displayed in the social media website 1200 as described above. Also, as illustrated in this example, the container 205 streams the video content from another website (e.g., youtube.com) while providing the container functionality as described above.

Figure 13:
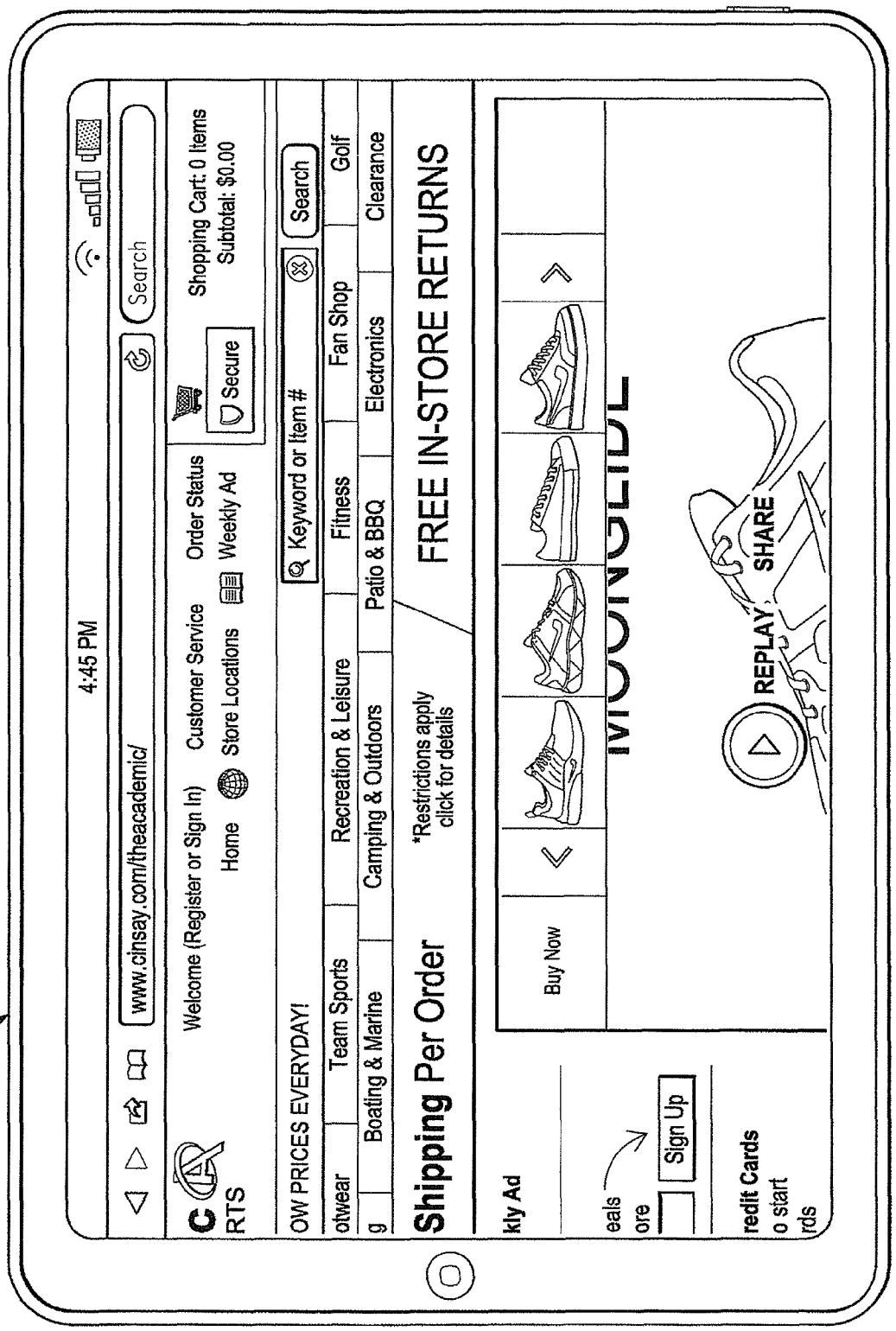
FIG. 13 illustrates an example display of a container implemented within a webpage on a tablet computer in accordance with one embodiment of the present disclosure.
Figure 14:
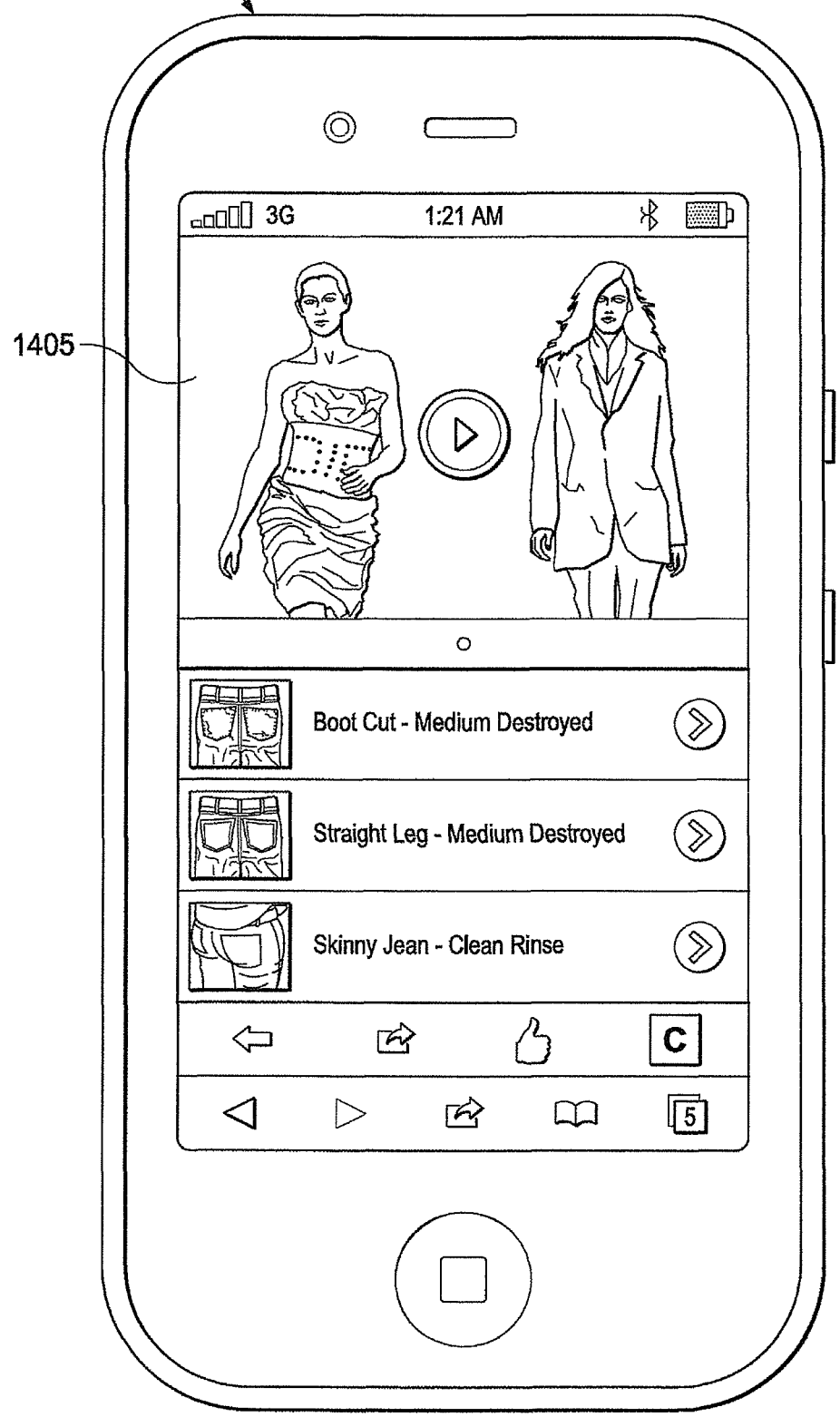
FIG. 14 illustrates an example display of a container implemented within a mobile device in accordance with one embodiment of the present disclosure.

FIG. 13 illustrates an example display of a container implemented within a webpage on a tablet computer 1300 in accordance with one embodiment of the present disclosure. As depicted in FIG. 12, the container 205 customizes itself to adapt to and render in a browser for the tablet computer 1300. FIG. 14 illustrates an example display of a container implemented within a display 1400 of a mobile device in accordance with one embodiment of the present disclosure. As depicted in FIG. 14, the container 205 customizes itself to adapt to and render in a user interface 1405 in the display 1400 of the mobile device. For example, the container 205 may be generated in a separate application for the container 205, an application for a social media website (e.g., Facebook™ app, Twitter™ app, etc.), or a web browser.

By bringing the store to the customer, the container 205 enables many new ways for merchants to connect with their consumers without disrupting the consumers' web activities. The end result is to connect the consumer directly with the merchant eliminating the intermediary and promoting a much more natural shopping experience.

According to an embodiment of the disclosure, an innovative new method for merchants to administer their virtual stores online is provided. To manage features with the container 205, an administrative feature may be provided via the admin server(s) 270 in what is referred to as an administration application. In an online administration model, merchants are typically required to have a fully featured computing device with persistent access to the World Wide Web. As an alternative to such a scenario and to enable on-the-go management, an embodiment of the disclosure provides merchants with a fully featured administration application—executable on mobile, handheld and smart devices—that is capable of creating and administering an entire virtual online store. In such embodiments, camera and video features may be utilized to capture digital assets for the container 205, whereas the mobile device's communication capabilities may be utilized to not only upload the digital assets, but also to issue commands and/or retrieve information for the management of an account that is used to create objects for the container 205.

The administration application for the mobile device is capable of running in both connected and disconnected modes. In a connected mode, the mobile administration application sends commands to the remote server instructing it to perform various actions related to store administration. Alternatively, in a disconnected mode, the mobile administration application performs all of the commands locally, on the installed device, with periodic synchronization to the remote server.

Below are non-limiting features of administration applications for the mobile device:

Onboarding Management Capability: allows merchants to take a step-by-step video tutorial designed to streamline an onboarding process.

Store Management Capability: allows merchants to display, create, modify and remove Smart Stores' that belong to them.

Email Management Capability: allows merchants to display, create, modify and remove email templates.

Tax Management Capability: allows merchants to display, create, modify, remove and apply tax rules.

Shipping Management Capability: allows merchants to display, create, modify and apply shipping rules.

Display Unit Management Capability: allows merchants to display, create, modify, preview and remove video display units. In addition, this feature allows merchants to associate display units with stores that belong to the merchant.

Display Management Capability: allows merchants to configure advance settings, such as product purchase limit, user purchase limit, video play control, affiliate tracking, purchase instructions, thank you page content, end of video play content, as well as background images.

Video Management Capability: allows merchants to capture, upload, display, modify, preview, transcode, transcribe and remove videos. In addition, this feature allows merchants to associate videos with display units.

Library Management Capability: allows merchants to capture, upload, display, modify, preview and remove digital assets in both 3-D and 2-D formats.

Plan Management Capability: allows merchants to display, upgrade, downgrade and cancel subscriptions.

Reporting Capability: allows merchants to generate desired reports based on the e-commerce, video and social sharing analytical measures and correlations.

Customer Management Capability: allows merchants to display, create, modify, group and remove user information. In addition, this feature allows merchants to create notifications to users and/or groups.

Product Management Capability: allows merchants to display, create, modify and remove products of various types offered inside of the object. Products include, but are not limited to, a) e-commerce products; b) e-commerce products with variances; c) linkout products; d) donation products; e) coupons; f) downloadable products; and g) lead generation products. In addition, this feature allows merchants to associate products with stores.

Order Management Capability: allows merchants to display, create, modify, remove and disposition orders.

Promotion Management Capability: allows merchants to display, create, modify, remove and apply promotions.

Given the above, in particular embodiments, a user may create objects for virally spreadable container(s) 205 directly from a mobile device. As a non-limiting example, a user may shoot a video from the mobile device, upload the video asset from the mobile device (e.g., using the wireless network described in FIG. 1) to the server(s) 102, and then create and/or modify features of a new object from the mobile device using commands issued from the mobile device to the central server or servers. Thus, if the objects for the container 205 include an e-commerce store, a user can obtain the assets and create a virally spreadable e-commerce store—all from a mobile device.

In particular embodiments, a traditional web interface for the administration application may largely be replicated to allow a mobile user the convenience of modifying and/or creating information for one's account on the go.

In various embodiments, the container 205 technology allows users to select products and services in context of their video or animation viewing experience in the confines of the display unit for the container 205. Upon product or service selection, a user is presented with details of the selected product or service without leaving the confines of the display unit or interrupting the animation or video viewing experience, as illustrated for example in FIG. 5. Depending on the type, products or services in the display unit for the container 205 may be advertised or sold. Additionally, in particular configurations, the entire purchase or advertisement experience may be completely encompassed inside of the display unit for the container 205.

It is important to note that the container 205 retains all of the purchasing and advertising capabilities—substantially conducted in the same manner—when shared on social distribution channels, such as social networks or blogs. In particular configurations, the container 205 is fully capable to be distributed or virally syndicated upon any media that supports Adobe Flash™ and HTML5 technologies.

In addition to physical goods and services, the container 205 technology supports sale and redemption of digital goods, such as coupons and gift certificates. Digital products presented in the container 205 display units are available for purchase or as a reward for completing an action a merchant deems worthy of product redemption. Such actions may include purchase, submission of requested information, advertisement or video viewing or acknowledgement. Upon the sale of a digital product or as a result of the action deemed to be satisfactory to qualify a user for a digital product award, the digital product is available for redemption. A digital product can be redeemed using a variety of mechanisms, including, but not limited to: a) thanks for the purchase email; b) thanks for the purchase screen; c) end of play of a screen; or d) third party redemption web page.

In particular configurations, a "thanks for the purchase" email may constitute a digital mail delivered to the user upon performing a downloadable product redemption qualifying action. Digital mail provides instructions on how a downloadable product shall be redeemed. In other configurations, a "thanks for the purchase" screen is presented to the user upon performing a downloadable product redemption qualifying action. In such configurations, the aforementioned screen may optionally contain instruction on how to redeem downloadable product or how to download the product itself.

In other configurations, an "end of play screen" may be presented to the user upon completing an animation or video viewing experience until the end. In such configurations, the aforementioned screen may optionally contain instructions on how to redeem the downloadable product or how to download the product itself. In other configurations, a third party redemption webpage served by a third party provider to the user may be provided upon performing a downloadable product redemption qualifying action. The presented webpage may optionally contain instructions of how to redeem a downloadable product or how to download the product itself.

Various embodiments of the present disclosure also provide companion products and up sell products with intelligent Internet objects. The container 205 technology supports companion products and services as well as up sell products and services. Companion products and services are presented to the user at the time of the product selection or post product sale. Upon product or service selection, a user may be presented with details of the selected product or service, in addition to a matching mechanism. The matching mechanism either may be predefined or dynamically selected additional products or services that complement an original selection. The user is given a choice to perform an action using original product or service selection or proceed with a suggested product or service bundle. In the context of the container 205, an action is defined as a purchase, a charitable contribution, a submission of requested information, advertisement or video viewing or acknowledgement. An identical mechanism may be utilized during the post purchase process where, upon completion of the purchase, a user is presented with up sell products or services suggesting additional actions.

Any suitable algorithm may be utilized with either mechanisms based, for example, on common linkage between products and services. Alternatively, the algorithm may be based, for example, on a statistical analysis that looks at users and linked products to yield what linked products or services are most often purchased with a particular product or service or grouping of products or services. Yet other techniques will become apparent to one of ordinary skill in the art.

Various embodiments of the present disclosure provide a distributed shopping cart with intelligent Internet objects. The container 205 technology supports a distributed shopping cart (e.g., accessible via "add to cart" button 505 as illustrated in FIG. 5). The distributed shopping cart allows the user to begin the shopping process in one or several display units for container(s) and to complete the transaction in another container that belongs to a merchant or a group of merchants combined into a merchant network. A merchant network consists of merchants that own or several merchants that agree to share user shopping information. By definition, the smallest merchant network consists of a single merchant that enables a shared shopping experience. A user may be identified by a tracking mechanism. Such a tracking mechanism may consist of a cookie, personal credentials, or other suitable tracking techniques, including, for example, an account that has a username and password. Upon recognition of a user that has one or several shopping carts, a user may be prompted for a choice to continue a shopping experience where he/she left off. If a user chooses to continue the shopping experience, the shopping flow resumes from the spot where the shopping flow was last persisted. Otherwise, a new shopping cart will be created and the shopping flow will resume from the beginning. A similar mechanism may be utilized for products and services involving charitable contributions or contact information collection. A last known persistence point allows a choice for workflow resumption.

As a brief recapitulation of the above and as an example, a user may be visiting a friend's Facebook™ wall and see a display of a container with something of interest. The particular container display may become associated with the user upon the user's interaction with the container using any suitable tracking mechanism. As a simple example, a user may log into a particular account directly within the display to associate the container and any items placed within a shopping cart with the user. The user may then visit another site or simply access a container display via an email. Upon the display being associated with the same user, the user may access the items previously placed within the cart and continue shopping, placing additional items within the cart. The above is a non-limiting example and is not intended to preclude other manners of accessing the distributed shopping cart.

Various embodiments of the present disclosure provide distributed retargeting of products with intelligent Internet objects. The container 205 supports distributed retargeting of products and services. Distributed retargeting of products and services allows merchants to display products or services that were viewed or similar to the products or services that were viewed by users that belong to a merchant or a group of merchants combined into the merchant network. Upon recognition of a user that has viewed one or several products or services in the container 205 or a merchant website belonging to the same merchant network, the user may be presented with the products or services that were viewed or similar to the products and services that were viewed during previous visits. Any suitable algorithm may be used for the presentment of distributed retargeting, including collaborative filtering and others. Such algorithms may avail from data from a group of merchants. Additionally, in the distributed retargeting, additional types of media may be shown with such media associated with the other products or services.

Various embodiments of the present disclosure provide dynamic configuration of intelligent internet objects. The container 205 technology supports dynamic configuration. The dynamic configuration allows the container 205 to determine the number of screens, screen fields, field validation, business rules and user specific characteristics based on the configuration file that is passed to the container 205 technology during the runtime or assembly time. The configuration file contains configuration metadata. Upon receipt of the configuration file, the container 205 determines what screens, containing what fields, requiring what validation should be presented to the user. Based on the user input, the container 205 interprets business rules passed to it using the configuration file, the logic and the flow of the screen execution. In addition to accepting metadata centric configuration files, the container 205 allows inclusion of third party dynamic flows. Such flows can be passed to the container 205 in the form of executable files during container 205 configuration or during runtime. Just like dynamic configuration files, third party dynamic flows contain screens, screen fields, field validation, business rules and user-specific characteristics. Unlike dynamic configuration files, third party dynamic flows may not require separate interpretation steps and can be executed natively inside of the web browser.

Figure 15:
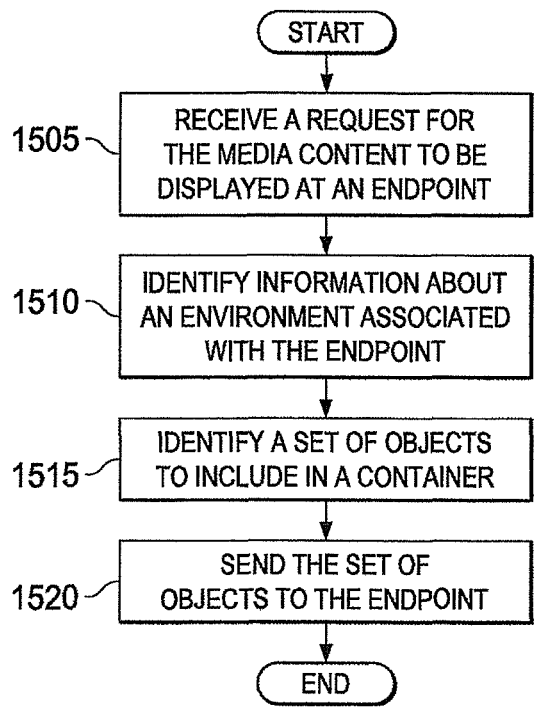
FIG. 15 depicts a flowchart of a process for including objects with media content in accordance with disclosed embodiments.

FIG. 15 depicts a flowchart of a process for including objects with media content in accordance with disclosed embodiments. This process can be performed, for example, by one or more servers, such as, for example, the server(s) 102 in FIG. 1, configured to perform acts described below, referred to in the singular as "the system." The process may also be performed by the configurator 285 in the container management environment 200 in FIG. 2. The process can be implemented by executable instructions stored in a non-transitory computer-readable medium that cause one or more servers to perform such a process.

The process begins by the system receiving a request for the media content to be displayed at an endpoint at block 1505. For example, in block 1505, the system may receive the request as a click to play a video or may receive the request from a second endpoint where the media content has been viewed and shared to the first endpoint.

Thereafter, the system identifies information about an environment associated with the endpoint at block 1510. For example, in block 1510, the system may identify a type of a device associated with the endpoint, a website where the media content is to be displayed, and a network speed between the endpoint and the system. In other examples, the system may identify information about a location of a device associated with the endpoint.

The system then identifies a set of objects to send with the requested media content based on the information identified about the environment at block 1515. For example, in block 1515, the system may include objects and the media content in a container (e.g., the container 205 in FIG. 2). At least one of the objects in the set includes program code for completing an electronic commerce transaction during display of the media content. For example, the electronic commerce transaction may be purchasing a good or service, donating money, or submitting a sales lead.

In some examples, the system may identify information about a user associated with the second endpoint and identify objects to send with the requested media content based on the information about the user. For example, higher quality media content may be sent where the network bandwidth between an endpoint and the system is high. In other examples, the system may identify rendering parameters associated with the type of the device or the website and include objects designed to generate the display of the media content in the set of objects to send based on the rendering parameters. In other examples, the system may identify a product to advertise with the media content, a language for text associated with the media content and/or a type of video to send as the media content for display based on information about the location of the device and include appropriate objects in the container. In yet other examples, the system may identify information about a status of the marketing campaign associated with the media content and objects based on the information about the status of the marketing campaign.

In a variety of configurations, analytics may be utilized to determine what to send to a user based on their environment and/or profile information about the user. For example, based on a geographic location or determined profile, a shirt advertisement may be sent as opposed to a hat advertisement (which may also be shown in the video) because the analytics are showing the shirt to be more likely to sell than the hat.

Thereafter, the system sends the set of objects including the media content for display at the endpoint in block 1520. For example, in block 1520, the system sends the container to the endpoint for the media content to be displayed and the electronic transaction opportunities to occur. As referenced above, the objects and media may be sent separately or together.

Figure 16:
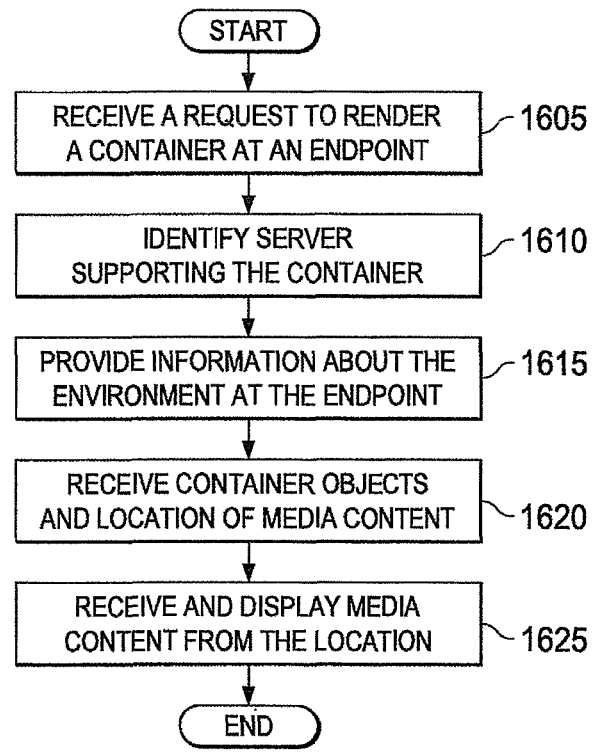
FIG. 16 depicts a flowchart of a process for rendering a container at an endpoint in accordance with disclosed embodiments.

FIG. 16 depicts a flowchart of a process for rendering a container at an endpoint in accordance with disclosed embodiments. This process can be performed, for example, by the endpoint, such as, for example, the endpoint(s) 110 or 120 in FIG. 1, configured to perform acts described below. The process can be implemented by executable instructions stored in a non-transitory computer-readable medium that cause one or more servers to perform such a process.

The process begins by receiving a request to render a container at an endpoint at block 1605. For example, in block 1605, the process may receive the request from a user requesting to view a video clip associated with the container. The process may also receive the request from a user sharing the container. The process then identifies a server supporting the container at block 1610. For example, in block 1610, the process may identify the server from the container. The server may be one or more of the server(s) 102 in FIG. 1. In other examples, the server may be the configurator 285 or one of the backend event server(s) 260 in FIG. 2.

Thereafter, the process provides information about the environment at the endpoint at block 1615. For example, in block 1615, the process may provide the identifier of the container information about the endpoint (e.g., website, device type, IP address), information about the user sharing or requesting to view the video, cookies, shopping cart information, container tethering information and/or any other type of information that may be useful in selecting objects to include in the container.

The process then receives container objects and location of media content at block 1620. For example, in block 1620, the process receives the container objects from the configurator 285 having configured or otherwise selected the objects to include in the container. The location of the media content may be a server that the media player in the container is to stream or otherwise receive the media content. Thereafter, the process receives and displays media content from the location at block 1625. For example, in block 1625, the process may stream the media content inside a display unit for the container from a media server specified in the container.

Figure 17:
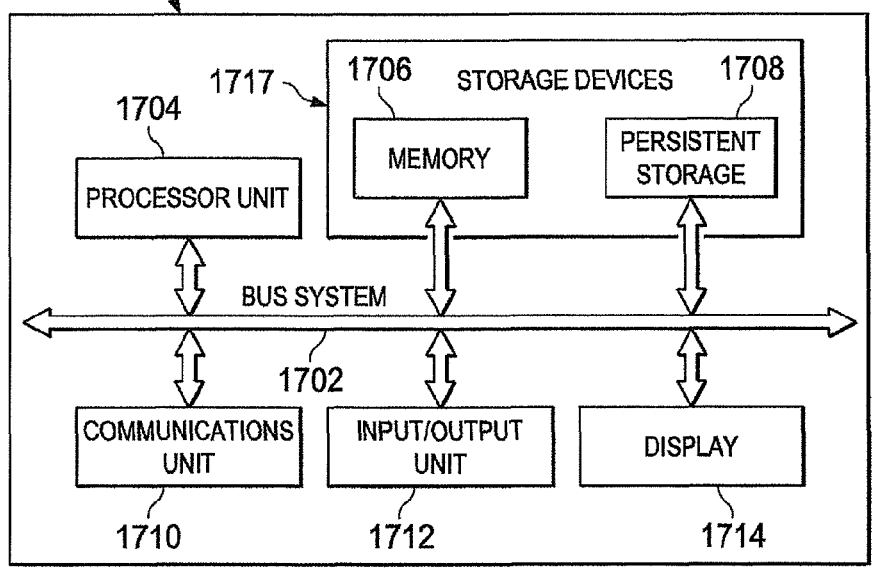
FIG. 17 illustrates a data processing system that may be used to implement various embodiments of the present disclosure.

FIG. 17 illustrates a data processing system 1700 that may be used to implement various embodiments of the present disclosure. For example, the data processing system 1700 that may be used in connection with other embodiments of the disclosure to carry out any of the above-referenced functions and/or serve as a computing device for server(s) 102 and/or endpoint(s) 110 and 120 of FIG. 1. Data processing system 1700 may generally be adapted to execute any of the known OS2, UNIX, Mac-OS, Linux, Android and/or Windows Operating Systems or other operating systems. In this example, the data processing system 1700 includes a bus system 1702, which provides communications between a processor 1704, a memory 1706, a persistent storage 1708, a communications unit 1710, an input/output (I/O) unit 1712, and a display 1714.

The processor 1704 processes instructions for software that may be loaded into the memory 1706. The processor 1704 may be a number of processors, a multi-processor core or some other type of processor, depending on the particular implementation. Further, the processor 1704 may be implemented using a number of heterogeneous processor systems in which a main processor is present with secondary processors on a single chip. As another illustrative example, the processor 1704 may be a symmetric multi-processor system containing multiple processors of the same type.

The memory 1706 and the persistent storage 1708 are examples of storage devices 1717. A storage device is any piece of hardware that is capable of storing information, such as, for example, without limitation; data, program code in functional form and/or other suitable information either on a temporary basis and/or a permanent basis. The memory 1706, in these examples, may be, for example, a random access memory or any other suitable volatile or non-volatile storage device. For example, the persistent storage 1708 may contain one or more components or devices. For example, the persistent storage 1708 may be a hard drive, a flash memory, an optical disk, a rewritable magnetic tape or some combination of the above. The media used by the persistent storage 1708 also may be removable. For example, a removable hard drive may be used for the persistent storage 1708.

The communications unit 1710 provides for communications with other data processing systems or devices. For example, the communications unit 1710 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. For example, the communications unit 1710 may include a network interface card. The communications unit 1710 may provide communications through the use of either or both physical and wireless communications links. The communications unit 1710 may also include a radio frequency (RF) transceiver enabling wireless network communication (e.g., WiFi, cellular data connection, etc.). The communications unit 1710 may also include a GPS transceiver enabling positional location information.

The input/output unit 1712 allows for input and output of data with other devices that may be connected to the data processing system 1700. For example, the input/output unit 1712 may provide a connection for user input through a keyboard, a mouse, a touch screen and/or some other suitable input device. Further, the input/output unit 1712 may send output to a printer. The input/output unit 1712 may also include or be connected to a camera, microphone, speaker, accelerometer and/or proximity sensor. The data processing system 1700 may utilize inputs and outputs from a camera, microphone, speaker, accelerometer and/or proximity sensors in accordance with various communication and data transfer principles of the present disclosure. The display 1714 provides a mechanism to display information to a user. For example, the display 1714 may be a touch screen.

Program code for an operating system, applications or other programs may be located in the storage devices 1717, which are in communication with the processor 1704 through the bus system 1702. In some embodiments, the program code is in a functional form on the persistent storage 1708. These instructions may be loaded into the memory 1706 for processing by the processor 1704. The processes of the different embodiments may be performed by the processor 1704 using computer implemented instructions, which may be located in the memory 1706. For example, the processor 1704 may perform processes for one or more of the modules and/or devices described above.

In some embodiments, various functions described above are implemented or supported by a computer program product that is formed from computer-readable program code and that is embodied in a computer-readable medium. Program code for the computer program product may be located in a functional form on a computer-readable storage device that is selectively removable and may be loaded onto or transferred to the data processing system 1700 for processing by the processor 1704. In some illustrative embodiments, the program code may be downloaded over a network to the persistent storage 1708 from another device or data processing system for use within the data processing system 1700. For instance, program code stored in a computer-readable storage medium in a server data processing system may be downloaded over a network from the server to the data processing system 1700. The data processing system providing program code may be a server computer, a client computer, or some other device capable of storing and transmitting program code.

As will be appreciated by one skilled in the art, aspects of the present disclosure may take the form of a computer program embodied in one or more computer-readable storage medium(s) having program code embodied thereon. A computer-readable storage medium may be, for example, without limitation, a portable computer diskette, a hard disk, a random access memory (RAM), a read-only memory (ROM), an erasable programmable read-only memory (EPROM), flash memory, a portable compact disc read-only memory (CD-ROM), an optical storage device, a magnetic storage device or any suitable combination of the foregoing. The program code may also be loaded for execution by a processor to provide processes for implementing the functions or operations described in the present disclosure.

Although FIG. 17 provides one embodiment of a data processing system that may be utilized with other embodiments of the disclosure, such other embodiments may additionally utilize computers other than general purpose computers as well as general purpose computers without conventional operating systems. Additionally, embodiments of the disclosure may also include data processing systems 1700 or other computers networked together in a computer network. Most commonly, multiple data processing systems 1700 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 17, the logic includes computer software executable on the data processing system 1700. The medium may include the memory 1706, the persistent storage 1708 or other mediums. In other embodiments, the logic may be contained within hardware configuration or a combination of software and hardware configurations. The logic may also be embedded within any other suitable medium without departing from the scope of the disclosure.

The functionality of the above description, once again may avail from any of the components described in FIGS. 1-17 or other suitable components. The code, itself, may be written in any suitable format, including, but not limited to Java, C++, C-sharp, HTML, HTML5, and the like.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    identifying a first container configured to serve media content, the first container including an object having computer-readable program code configured when executed to allow completion of a first transaction during display of the media content; and
    provisioning a tethering object in the first container, the tethering object including computer-readable program code configured when executed to link the first container with a second container and to synchronize display of media content associated with the first container and the second container, the second container including an object having computer-readable program code configured when executed to allow completion of a second transaction during display of the media content.

2. The method of claim 1, wherein the tethering object further includes computer-readable program code configured when executed to allow multiple users to share purchases.

3. The method of claim 1, wherein the tethering object further includes computer-readable program code configured when executed to allow multiple users to share a common shopping cart.

4. The method of claim 1, wherein the tethering object further includes computer-readable program code configured when executed to provide an interface supporting communication between multiple users.

5. The method of claim 4, wherein the users are associated with different endpoints.

6. The method of claim 4, wherein the interface is configured to support at least one of: text communications, voice communications, or video communications between the users.

7. The method of claim 1, wherein the first container further includes an object having computer-readable program code configured when executed to play the media content.

8. The method of claim 1, wherein the first container further includes an object having computer-readable program code configured when executed to syndicate the first container from one endpoint to another endpoint.

9. The method of claim 8, wherein the first container is configured to be syndicated via social media.

10. The method of claim 1, wherein the first container further includes an object having computer-readable program code configured when executed to authenticate a user associated with the first transaction.

11. A non-transitory computer readable medium comprising logic that when executed causes at least one processing device to:
    generate a first container configured to serve media content, the first container including an object having computer-readable program code configured when executed to allow completion of a first transaction during display of the media content; and
    provision a tethering object in the first container, the tethering object including computer-readable program code configured when executed to link the first container with a second container and to synchronize display of media content associated with the first container and the second container, the second container including an object having computer-readable program code configured when executed to allow completion of a second transaction during display of the media content.

12. The non-transitory computer readable medium of claim 11, wherein the tethering object further includes computer-readable program code configured when executed to allow multiple users to share purchases.

13. The non-transitory computer readable medium of claim 11, wherein the tethering object further includes computer-readable program code configured when executed to allow multiple users to share a common shopping cart.

14. The non-transitory computer readable medium of claim 11, wherein the tethering object further includes computer-readable program code configured when executed to provide an interface supporting communication between multiple users.

15. The non-transitory computer readable medium of claim 14, wherein the interface is configured to support at least one of: text communications, voice communications, or video communications between the users.

16. The non-transitory computer readable medium of claim 11, wherein the first container further includes an object having computer-readable program code configured when executed to play the media content.

17. The non-transitory computer readable medium of claim 11, wherein the first container further includes an object having computer-readable program code configured when executed to syndicate the first container from one endpoint to another endpoint.

18. The non-transitory computer readable medium of claim 17, wherein the first container is configured to be syndicated via social media.

19. The non-transitory computer readable medium of claim 11, wherein the first container further includes an object having computer-readable program code configured when executed to authenticate a user associated with the first transaction.

20. A system comprising:
    at least one processing device configured to:
        generate a first container configured to serve media content, the first container including an object having computer-readable program code configured when executed to allow completion of a first transaction during display of the media content; and
        provision a tethering object in the first container, the tethering object including computer-readable program code configured when executed to link the first container with a second container and to synchronize display of media content associated with the first container and the second container, the second container including an object having computer-readable program code configured when executed to allow completion of a second transaction during display of the media content.

21. The system of claim 20, wherein the tethering object further includes computer-readable program code configured when executed to allow multiple users to share purchases.

22. The system of claim 20, wherein the tethering object further includes computer-readable program code configured when executed to allow multiple users to share a common shopping cart.

23. The system of claim 20, wherein the tethering object further includes computer-readable program code configured when executed to provide an interface supporting communication between multiple users.

24. The system of claim 23, wherein the interface is configured to support at least one of: text communications, voice communications, or video communications between the users.

25. The system of claim 20, wherein the first container further includes an object having computer-readable program code configured when executed to play the media content.

26. The system of claim 20, wherein the first container further includes an object having computer-readable program code configured when executed to syndicate the first container from one endpoint to another endpoint.

27. The system of claim 26, wherein the first container is configured to be syndicated via social media.

28. The system of claim 20, wherein the first container further includes an object having computer-readable program code configured when executed to authenticate a user associated with the first transaction.

* * * * *